(12) United States Patent
Takata

(10) Patent No.: US 12,394,853 B2
(45) Date of Patent: Aug. 19, 2025

(54) POWER SUPPLY DEVICE, AND ELECTRIC VEHICLE AND ELECTRICAL STORAGE DEVICE EACH EQUIPPED WITH SAME

(71) Applicant: SANYO Electric Co., Ltd., Osaka (JP)

(72) Inventor: Hiroshi Takata, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 686 days.

(21) Appl. No.: 17/633,233

(22) PCT Filed: Jul. 20, 2020

(86) PCT No.: PCT/JP2020/028030
§ 371 (c)(1),
(2) Date: Feb. 7, 2022

(87) PCT Pub. No.: WO2021/033476
PCT Pub. Date: Feb. 25, 2021

(65) Prior Publication Data
US 2022/0285778 A1 Sep. 8, 2022

(30) Foreign Application Priority Data
Aug. 22, 2019 (JP) .................... 2019-152167

(51) Int. Cl.
*H01M 50/262* (2021.01)
*H01M 50/209* (2021.01)
(Continued)

(52) U.S. Cl.
CPC ....... *H01M 50/262* (2021.01); *H01M 50/209* (2021.01); *H01M 50/238* (2021.01); *H01M 50/249* (2021.01); *H01M 2220/20* (2013.01)

(58) Field of Classification Search
CPC ................................................ H01M 50/209
See application file for complete search history.

(56) References Cited

U.S. PATENT DOCUMENTS

| 5,766,801 A | 6/1998 | Inoue et al. |
| 2010/0271036 A1* | 10/2010 | Kishimoto ............ H01M 50/51 |
| | | 324/434 |

(Continued)

FOREIGN PATENT DOCUMENTS

| CN | 105556700 A | 5/2016 |
| CN | 205564882 U | 9/2016 |

(Continued)

OTHER PUBLICATIONS

English translation of Search Report dated Dec. 12, 2023, issued in counterpart CN Application No. 202080059324.6. (3 pages).

(Continued)

*Primary Examiner* — Barbara L Gilliam
*Assistant Examiner* — Jordan E Berresford
(74) *Attorney, Agent, or Firm* — WHDA, LLP

(57) ABSTRACT

Provided is a power supply device that is configured to dispose each of battery cells at an ideal position while stacking the battery cells to form a battery stack, the power supply device including: battery cells each having an outer covering can in a prismatic shape and having a constant cell thickness; end plates paired for covering both side end surfaces of the battery stack in which battery cells are stacked; and bind bars that are disposed on opposite side surfaces of the battery stack and coupled to the end plates. Bind bar includes pressing piece for pressing an upper surface of each of battery cells adjacent to each other. The power supply device further includes elastomer molding disposed between pressing piece and an upper surface of battery cell, and pressing piece elastically presses the upper surface of battery cell with elastomer molding.

13 Claims, 21 Drawing Sheets

(51) Int. Cl.
    *H01M 50/238*    (2021.01)
    *H01M 50/249*    (2021.01)

(56) References Cited

U.S. PATENT DOCUMENTS

| | | |
|---|---|---|
| 2013/0273404 A1 | 10/2013 | Ochi et al. |
| 2015/0270589 A1 | 9/2015 | Ejiri et al. |
| 2016/0149180 A1 | 5/2016 | Tokoo et al. |
| 2016/0260946 A1 | 9/2016 | Ochi et al. |
| 2017/0271710 A1 | 9/2017 | Zhou et al. |
| 2019/0051872 A1 | 2/2019 | Kakimura |
| 2019/0181488 A1* | 6/2019 | Ejima ................. H01M 50/209 |
| 2020/0251768 A1 | 8/2020 | Tajima |
| 2020/0259138 A1* | 8/2020 | Miyoshi .............. H01M 50/264 |

FOREIGN PATENT DOCUMENTS

| | | |
|---|---|---|
| DE | 102018213184 A1 | 2/2019 |
| JP | 9-120808 | 5/1997 |
| WO | 2015/145927 | 10/2015 |
| WO | 2019/065152 A1 | 4/2019 |

OTHER PUBLICATIONS

International Search Report of PCT application No. PCT/JP2020/028030 dated Sep. 15, 2020.
The Office Action dated Sep. 26, 2023, issued in counterpart to IN Application No. 202247006823, with English Translation. (5 pages).
Extended (Supplementary) European Search Report dated Jun. 28, 2023, issued in counterpart EP Application No. 20855551.6. (9 pages).

\* cited by examiner

POWER SUPPLY DEVICE, AND ELECTRIC VEHICLE AND ELECTRICAL STORAGE DEVICE EACH EQUIPPED WITH SAME

CROSS-REFERENCE TO RELATED APPLICATIONS

This application is a U.S. national stage application of the PCT International Application No. PCT/JP2020/028030 filed on Jul. 20, 2020, which claims the benefit of foreign priority of Japanese patent application No. 2019-152167 filed on Aug. 22, 2019, the contents all of which are incorporated herein by reference.

TECHNICAL FIELD

The present invention relates to a power supply device, and an electric vehicle and an electrical storage device that are equipped with the power supply device.

BACKGROUND ART

The power supply device is used as a power supply device for driving an electric vehicle, a power supply device for storing power, and the like. In such a power supply device, rechargeable battery cells are stacked. As illustrated in a perspective view of FIG. 22, power supply device 900 typically includes battery stack 910 that is obtained by alternately stacking battery cells 901 each with an outer covering can in a rectangular shape and insulating spacers 902, and that has both end surfaces on which respective end plates 903 are disposed, end plates 903 being joined to each other with bind bars 904 made of metal.

It is important for a power supply device with stacked battery cells to dispose each of the battery cells at a predetermined position. The power supply device of FIG. 22 includes the bind bars that are each provided on both upper and lower sides with respective bent pieces to prevent positional displacement of each battery cell in the vertical direction in the drawing. This power supply device is configured such that a battery cell in a rectangular shape is disposed at a predetermined position by holding both sides of the battery cell with the respective bent pieces provided up and down in the bind bar. Although this structure can prevent vertical positional displacement of the battery stack with the bind bar, there is a disadvantage that each battery cell is less likely to be always disposed at an optimum position. In particular, a battery cell in a rectangular shape cannot eliminate a dimensional error generated in a manufacturing process, and thus causing a change in dimension of each battery cell.

When the battery cell repeats charging and discharging, the outer covering can expands and contracts. In recent years, particularly capacity of the battery cell has been increased, and as a result, the amount of expansion tends to increase. The battery stack with a large number of battery cells as described above that are stacked and joined has a problem that each battery cell is less likely to be disposed at an ideal position for a long period of time due to difference in the amount of expansion of each battery cell.

CITATION LIST

Patent Literature

PTL 1: Unexamined Japanese Patent Publication No. H09-120808

SUMMARY OF THE INVENTION

It is an object of the present invention to provide a power supply device capable of disposing each of battery cells at an ideal position in a battery stack formed by stacking the battery cells, and an electric vehicle and an electrical storage device using the power supply device.

A power supply device according to an aspect of the present invention includes: battery cells 1 each having outer covering can 1$a$ in a prismatic shape and having a constant cell thickness; end plates 20 paired for covering both respective side end surfaces of battery stack 10 in which battery cells 1 are stacked; and bind bars 15 that are disposed on respective opposite side surfaces of battery stack 10 and coupled to respective end plates 20. Bind bar 15 includes pressing piece 15$l$ for pressing an upper surface of each of battery cells 1 adjacent to each other. The power supply device further includes elastomer molding 18 disposed between pressing piece 15$l$ and an upper surface of battery cell 1, and pressing piece 15$l$ elastically presses the upper surface of battery cell 1 with elastomer molding 18.

An electric vehicle according to an aspect of the present invention includes: power supply device 100; running motor 93 that receives electric power from power supply device 100; vehicle body 91 on which power supply device 100 and running motor 93 are mounted; and wheels 97 that are driven by running motor 93 to cause vehicle body 91 to travel.

An electrical storage device according to an aspect of the present invention includes: power supply device 100; and power supply controller 88 configured to control charging and discharging of power supply device 100, wherein power supply controller 88 enables charging of battery cells 1 with electric power supplied from an outside and is configured to control charging to battery cells 1.

The power supply device described above has a feature in that each of the battery cells can be disposed at an ideal position in the battery stack formed by stacking the battery cells.

DESCRIPTION OF EMBODIMENTS

Figure 1:
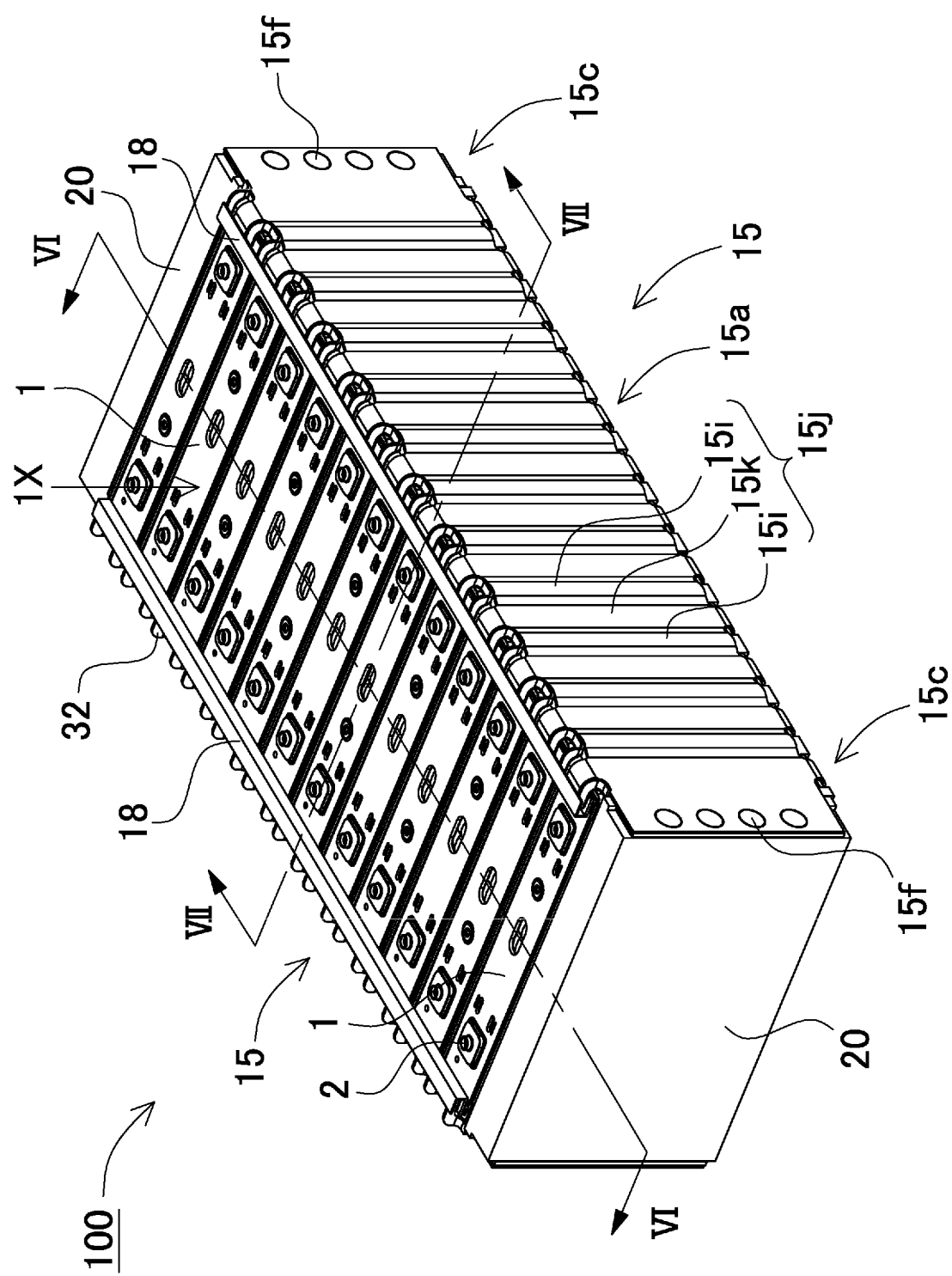
FIG. 1 is a perspective view illustrating a power supply device according to a first exemplary embodiment.

Exemplary embodiments of the present invention will be described below with reference to the drawings. However, the exemplary embodiments described below are examples that allow a technical idea of the present invention to be embodied, and the present invention is not limited to the exemplary embodiments described below. In the present description, components described in the scope of claims are not limited to the components of the exemplary embodiments. Unless otherwise specified, particulars including dimensions, materials, shapes, and relative positions of the components described in the exemplary embodiments are described as being mere examples and not as being restrictive of the present invention. The sizes and positional relationships of the members illustrated in the respective drawings may be exaggerated to clarify the explanation. In the following description, the same names or the same reference marks denote the same components or components of the same type, and detailed description is appropriately eliminated. Each element constituting the present invention may be configured such that a plurality of elements is composed of one member to allow the one member to serve as the plurality of elements, or conversely, a function of one member may be achieved by sharing with the plurality of members. Contents described in some examples or exemplary embodiments can be used, for example, in other examples or exemplary embodiments.

A power supply device according to a first exemplary embodiment of the present invention includes: battery cells each having an outer covering can in a prismatic shape and having a constant cell thickness; end plates paired for covering both side end surfaces of a battery stack in which the battery cells are stacked; bind bars that are disposed on respective opposite side surfaces of the battery stack and coupled to the respective end plates, the bind bars each including a pressing piece for pressing an upper surface of each of the battery cells adjacent to each other; and an elastomer molding disposed between the pressing piece and an upper surface of each of the battery cells, the pressing piece elastically pressing the upper surface of each of the battery cells with the elastomer molding.

The power supply device described above is configured such that the bind bars each include the pressing piece that presses the battery cell, and the pressing piece presses the upper surface of the battery cell with the elastomer molding, which is elastically deformable and interposed therebetween, to dispose the battery cell at a predetermined position, without directly pressing the upper surface of the battery cell. This structure has a feature in that the pressing piece for pressing the upper surface of each of the battery cells constituting the battery stack presses the upper surface of the battery cell with the elastomer molding interposed therebetween, and thus enabling the battery cells, which are repeatedly expanded and contracted due to charging and discharging and each have a dimensional error generated in the manufacturing process, to be pressed and disposed at respective predetermined positions. In particular, the pressing piece for pressing the upper surface of the battery cell with the elastomer molding interposed therebetween has a feature in that the pressing piece can evenly press the upper surface of the battery cell in a wide area to dispose the battery cell at a predetermined position. Although pressing with a strong force can prevent positional displacement of the battery cell, an excessively strong pressing force, particularly a forcibly strong pressing force, causes deformation or damage of the battery cell. The elastomer molding can come into surface contact with a surface of the battery cell to evenly press the battery cell in a wide area, so that the battery cell can be disposed at a predetermined position. This enables preventing damage to the battery cell due to a strong pressing force while disposing the battery cell at the predetermined position.

Additionally, the elastomer molding consumes large energy to deform itself, and thus has an extremely high ability to absorb vibration. The power supply device described above, in which the elastomer molding having the unique physical properties always holds the upper surface of the battery cell in a pressed state, has a feature in that the battery cell can be protected from vibration and impact in an environment under vibration and impact. The vibration and impact applied to the power supply device damage various parts of the battery cell, such as a fixing part of an electrode terminal of the battery cell, and a coupling part with a thick metal sheet fixed to the electrode terminal for connecting the battery cell in series or in parallel. The battery cell can be disposed at a predetermined position by pressing an upper surface of the battery cell with an elastic arm such as a metal sheet or a plastic sheet. However, such an elastic arm consumes only a small amount of energy to deform itself, i.e., the elastic arm has a large Q value, and thus has insufficient attenuation characteristics of vibration. As a result, vibration and impact of the battery cell cannot be effectively suppressed. The power supply device described above includes the elastomer molding having excellent attenuation characteristics of vibration and pressing the upper surface of the battery cell, so that the battery cell can be disposed at a predetermined position while vibration and impact of the battery cell are absorbed. Thus, the power supply device described above has a feature in that even when the power supply device is used for supplying power to a running motor of a vehicle, the battery cell can be used for a long period of time by being protected from vibration and impact.

A power supply device according to a second exemplary embodiment of the present invention includes elastomer moldings that independently press respective battery cells.

The power supply device described above has a feature in that the elastomer moldings independently press the respective battery cells to enable all the battery cells to be disposed at accurate positions even in a state where the battery cells have upper surfaces at ununiform positions due to a dimensional error, or an unbalanced amount of expansion caused by charging and discharging.

A power supply device according to a third exemplary embodiment of the present invention includes the bind bars each provided with pressing pieces that independently press respective battery cells.

The power supply device described above has a feature in that the pressing pieces independently press the respective battery cells to enable all the battery cells to be disposed at accurate positions even in a state where the battery cells have upper surfaces at ununiform positions due to a dimensional error, or an unbalanced amount of expansion caused by charging and discharging.

A power supply device according to a fourth exemplary embodiment of the present invention includes the elastomer molding that has a rubbery pressing part in a columnar shape or a plate shape protruding toward the upper surface of the battery cell.

The power supply device described above has a feature in that the pressing piece presses the upper surface of the battery cell with the rubbery pressing part in a columnar shape or a plate shape interposed therebetween by using a restoring force caused by deforming the rubbery pressing part into a short crushed shape, and deforming the columnar shape or the plate shape into a bent shape, so that a pressing force changes a little even when the amount of displacement of the battery cell increases, whereby the battery cell can be disposed at a predetermined position by constantly pressing the upper surface of the battery cell with a predetermined pressing force. This prevents the battery cell from being pressed and damaged by the elastomer molding with an excessively strong force even in a state where the battery cell expands and increases in the amount of displacement. Thus, there is a feature in that the battery cell can be disposed at a predetermined position while being prevented from being damaged.

A power supply device according to a fifth exemplary embodiment of the present invention includes the elastomer molding that has rubbery pressing parts different in protrusion height.

This power supply device has a feature in that the rubbery pressing parts different in protrusion height press the upper surfaces of the respective battery cells, so that the battery cells each having a large dimensional error can be reliably disposed at respective predetermined positions. This is because the rubbery pressing part with a high height presses the upper surface of the battery cell with a wide gap between the pressing piece and the upper surface of the battery cell, and many rubbery pressing parts press the upper surface of the battery cell with a narrow gap between the pressing piece and the upper surface of the battery cell, thereby disposing the battery cells at respective predetermined positions. In particular, the rubbery pressing part protruding high has a columnar shape and deforms itself in a bent manner to press the upper surface of the battery cell, so that the rubbery pressing part with a high height deforms in a bent manner even for the battery cell with a narrow gap between the pressing piece and the upper surface of the battery cell to dispose the battery cell at a predetermined position without pressing and damaging the battery cell under too strong pressure.

A power supply device according to a sixth exemplary embodiment of the present invention includes rubbery pressing parts that are disposed apart from each other in a longitudinal direction of the upper surface of the battery cell.

A power supply device according to a seventh exemplary embodiment of the present invention includes rubbery pressing parts in which at least one rubbery pressing part has a length at which the at least one rubbery pressing part buckles in a pressed state on the upper surface of the battery cell.

The power supply device described above includes the rubbery pressing part that presses the upper surface of the battery cell by deforming resulting in buckling, so that the battery cell is not pressed under too strong pressure even when the rubbery pressing part protruding high presses the upper surface of the battery cell. This enables the battery cell to be disposed at a predetermined position while preventing damage to the battery cell.

A power supply device according to an eighth exemplary embodiment of the present invention includes the elastomer molding that is made of an elastomer or rubber.

A power supply device according to a ninth exemplary embodiment of the present invention includes an insulating sheet disposed between the bind bar and the battery stack, and the insulating sheet is disposed between the pressing piece and the elastomer molding.

A power supply device according to a tenth exemplary embodiment of the present invention includes the bind bar that is a metal sheet, and the metal sheet is bent providing the pressing piece integrally with the bind bar.

The power supply device according to the exemplary embodiments of the present invention is used for various applications such as a power supply that is mounted on an electric vehicle such as a hybrid vehicle or an electric automotive and supplies power to a running motor, a power supply that stores generated power of natural energy such as solar power generation or wind power generation, and a power supply that stores midnight power, and is particularly used as a power supply suitable for an application for large power and large current. In the following example, exemplary embodiments applied to a power supply device for driving an electric vehicle will be described.

First Exemplary Embodiment

Figure 2:
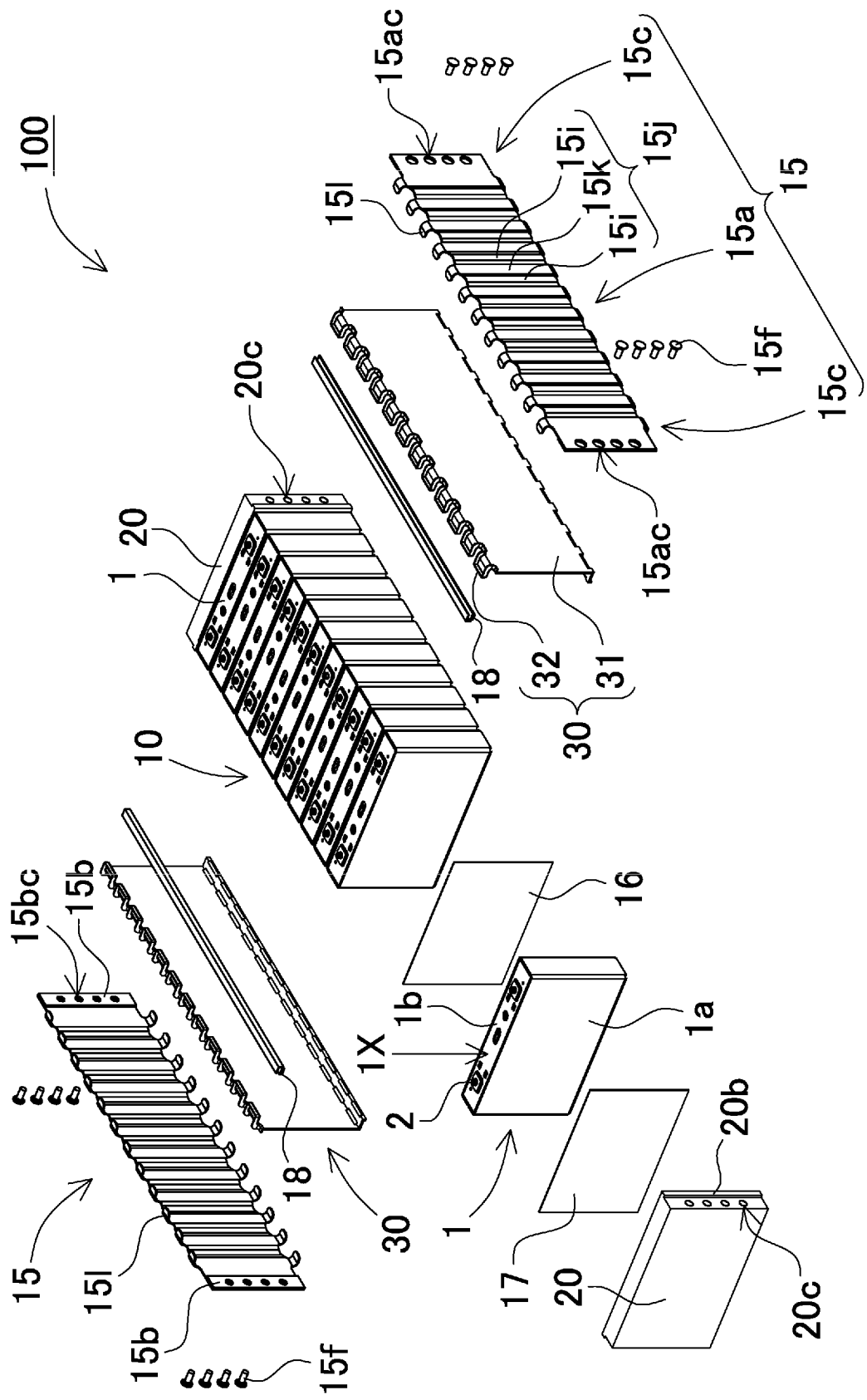
FIG. 2 is an exploded perspective view of the power supply device illustrated in FIG. 1.
Figure 3:
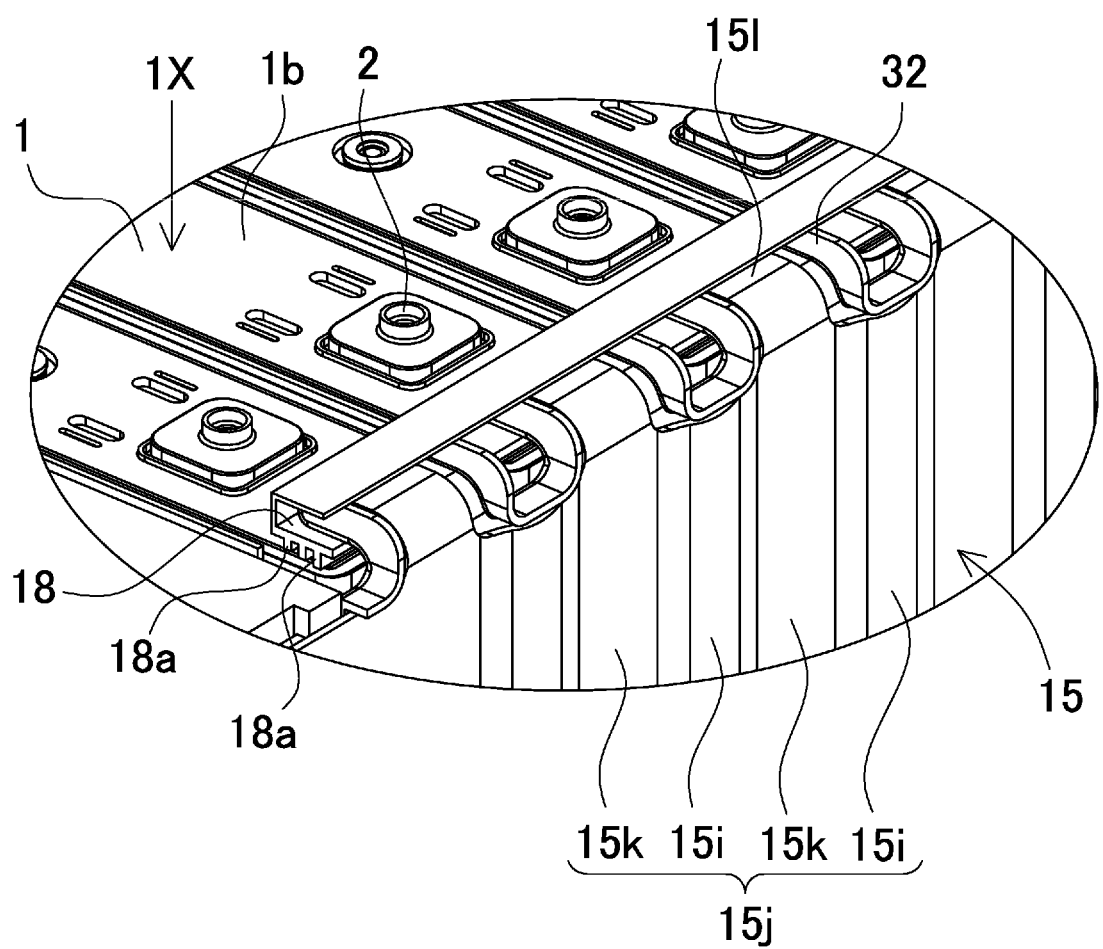
FIG. 3 is an enlarged perspective view of a main part of the power supply device of FIG. 1.
Figure 4:
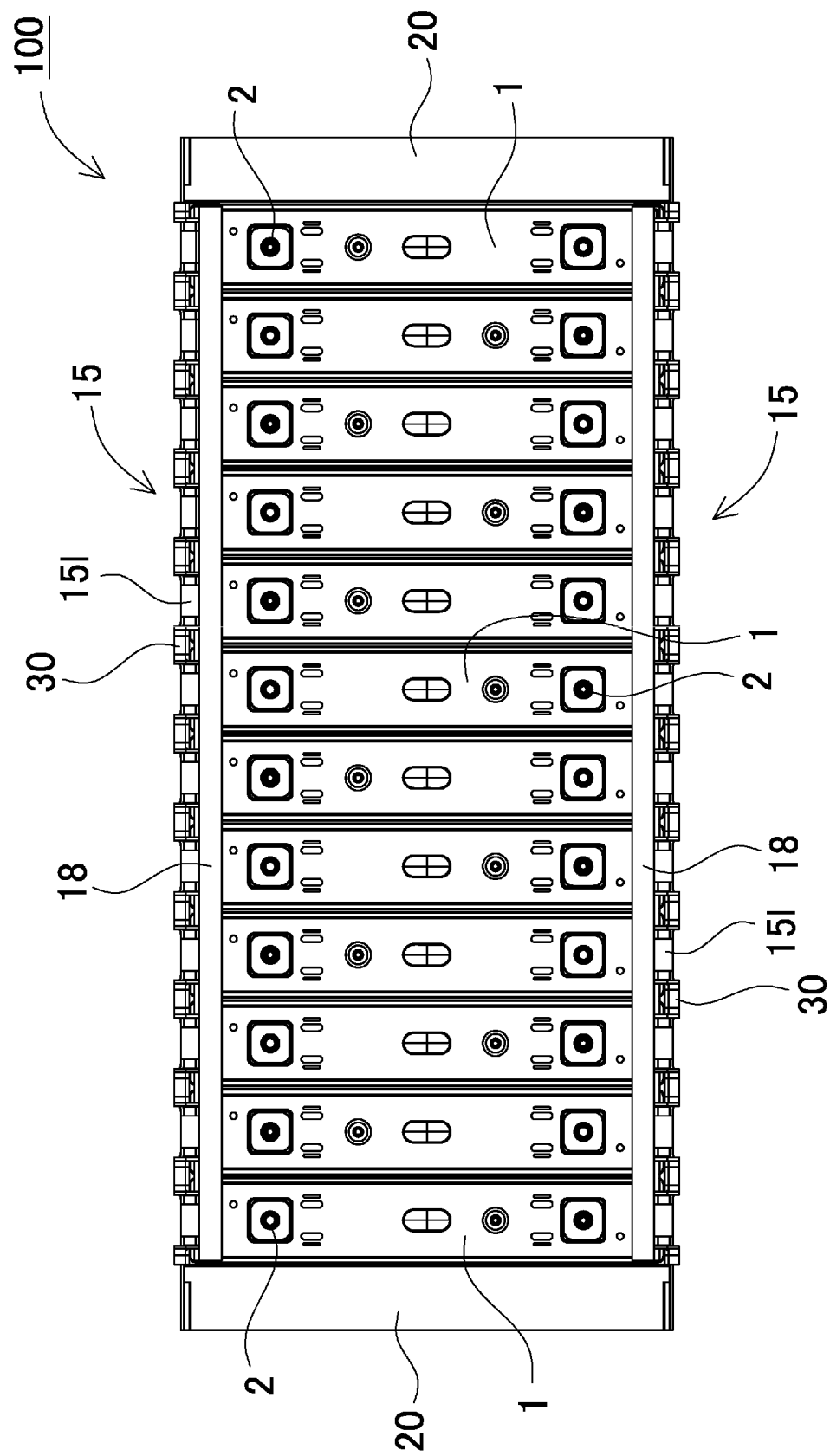
FIG. 4 is a plan view of the power supply device of FIG. 1.
Figure 5:
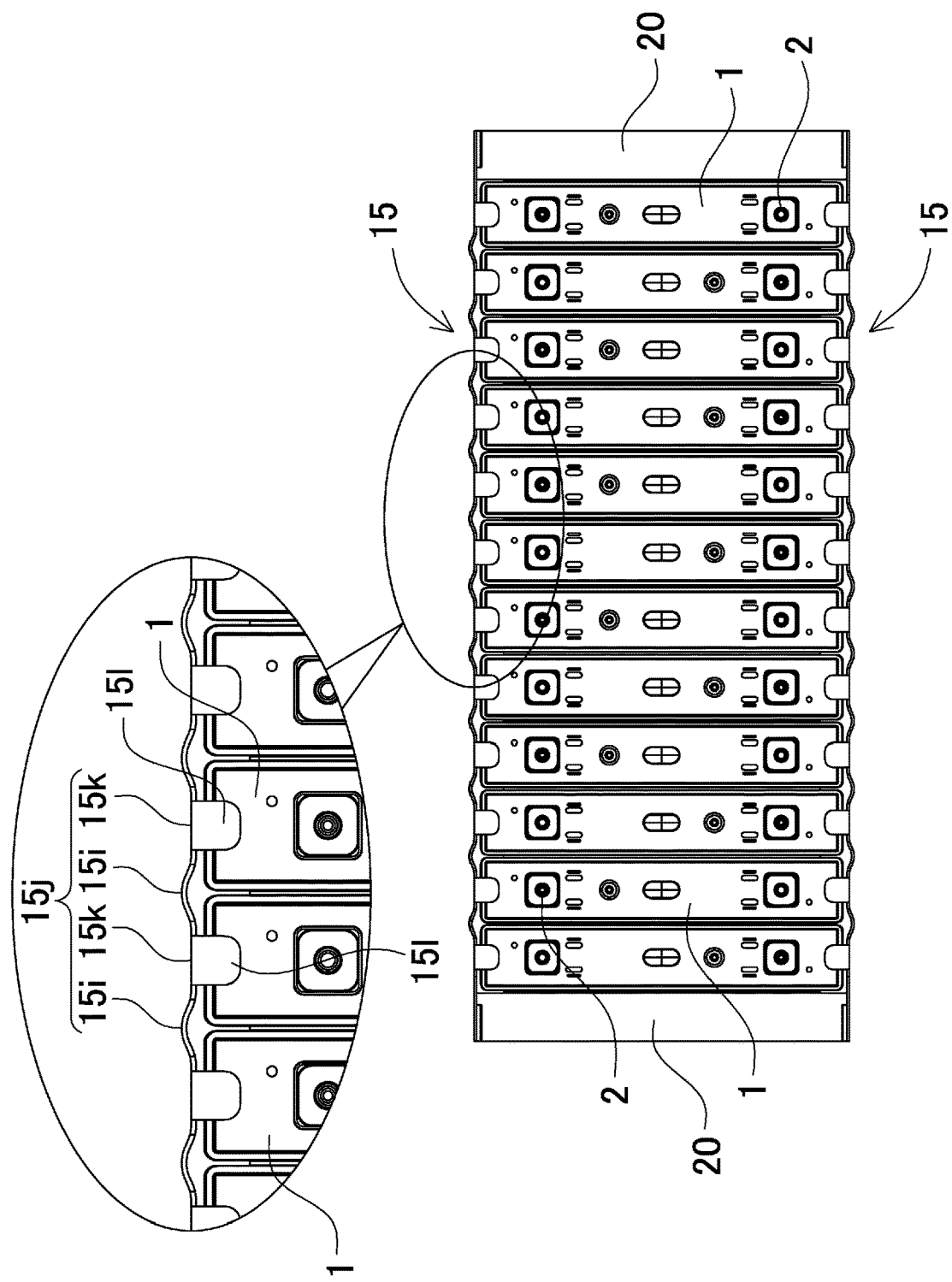
FIG. 5 is a plan view and an enlarged plan view of a main part of the power supply device of FIG. 4 in which an insulating sheet is not illustrated.
Figure 6:
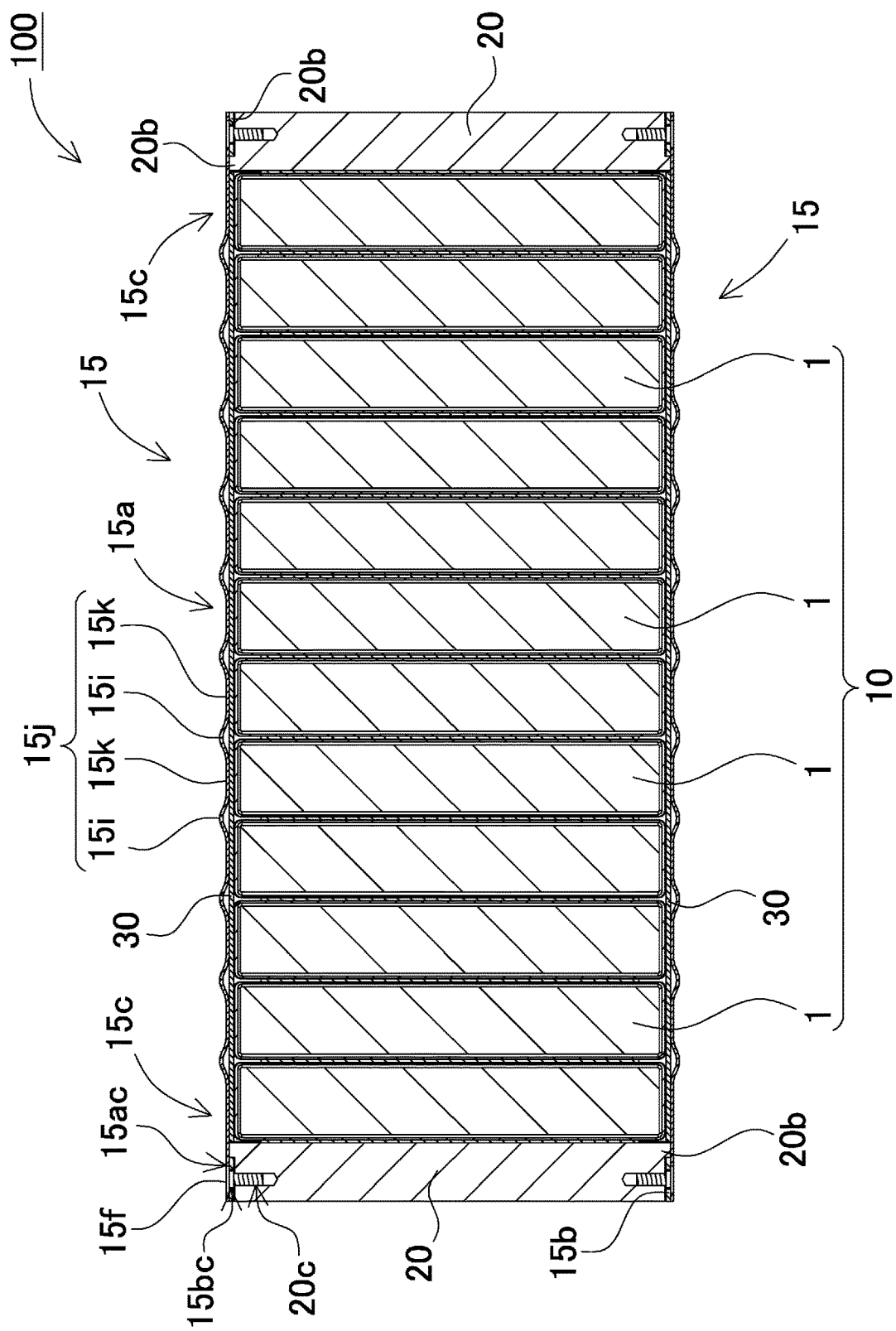
FIG. 6 is a horizontal sectional view taken along line VI-VI of the power supply device of FIG. 1.
Figure 7:
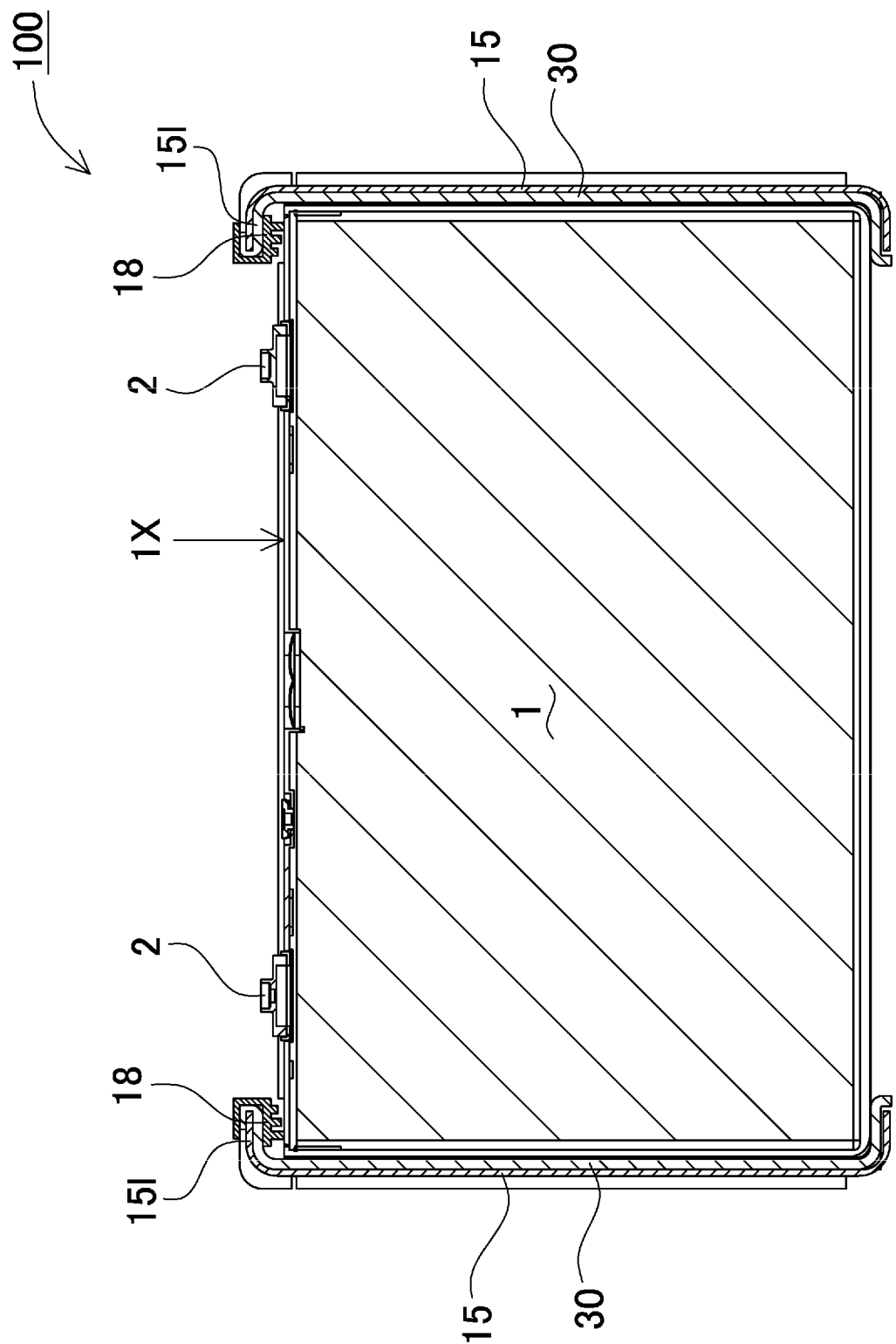
FIG. 7 is a vertical sectional view taken along line VII-VII of the power supply device of FIG. 1.
Figure 8:
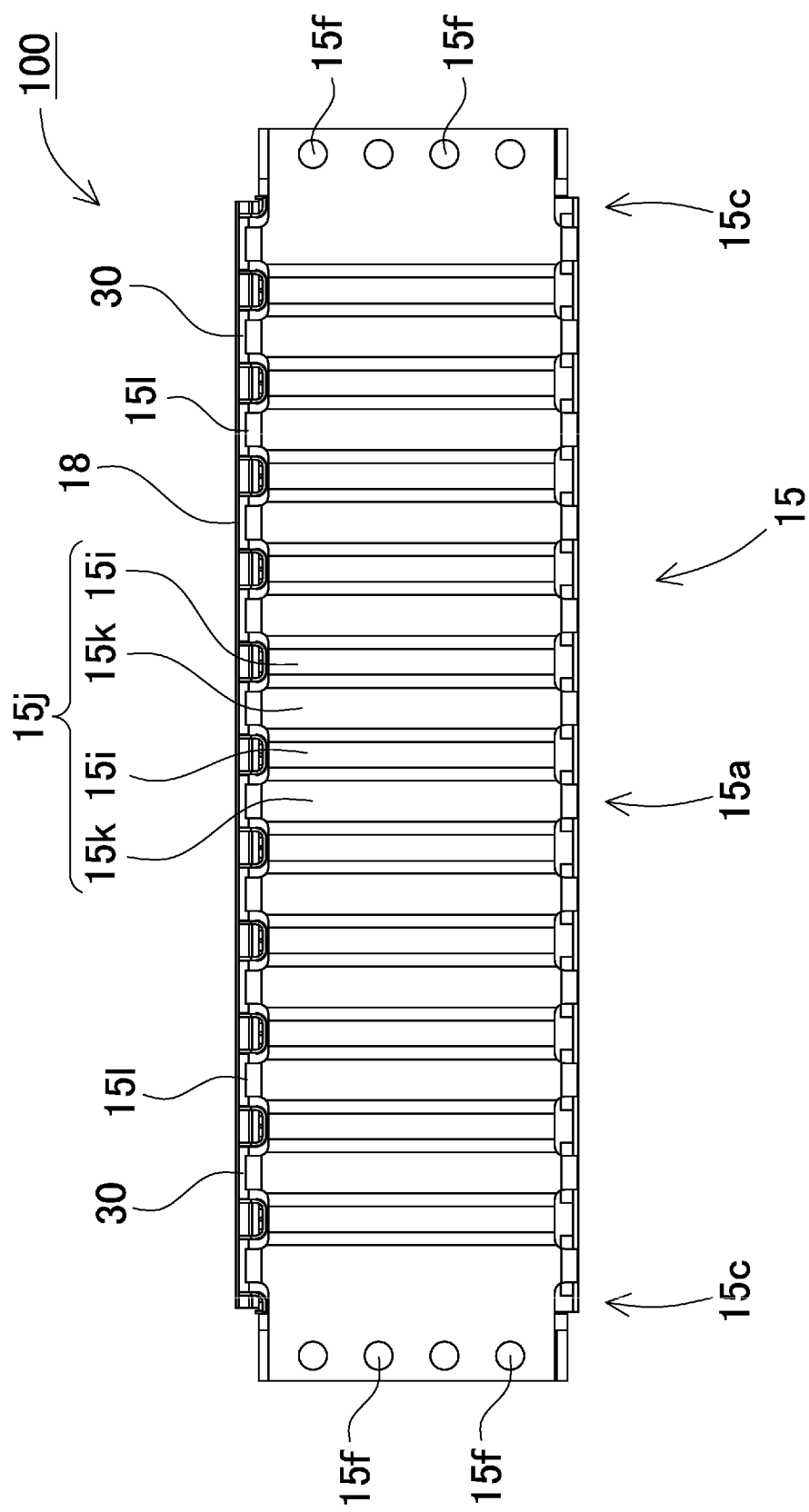
FIG. 8 is a side view of the power supply device of FIG. 1.
Figure 9:
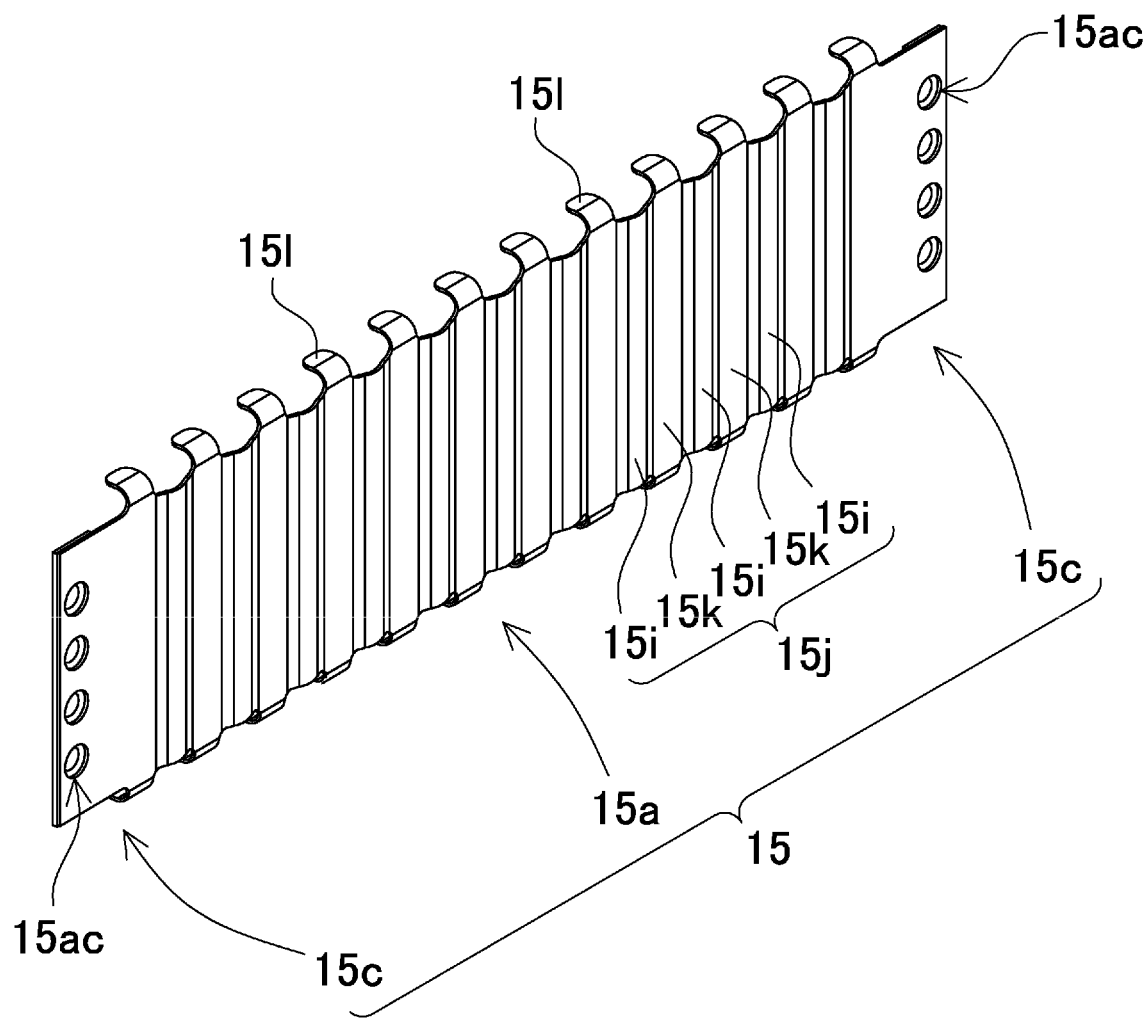
FIG. 9 is a perspective view illustrating a bind bar of FIG. 2.
Figure 10:
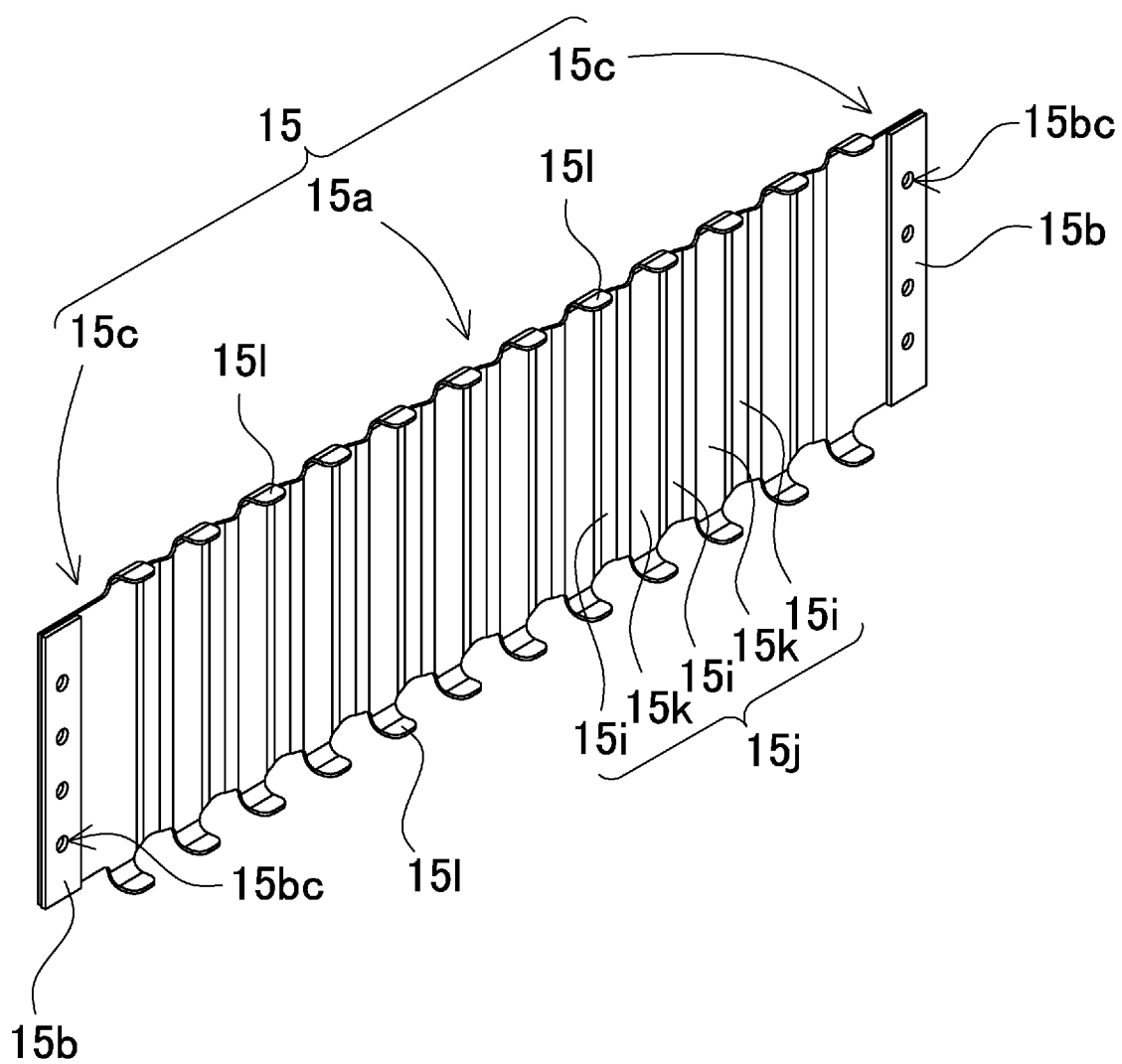
FIG. 10 is a perspective view of the bind bar in FIG. 9 as viewed from its back surface.
Figure 11:
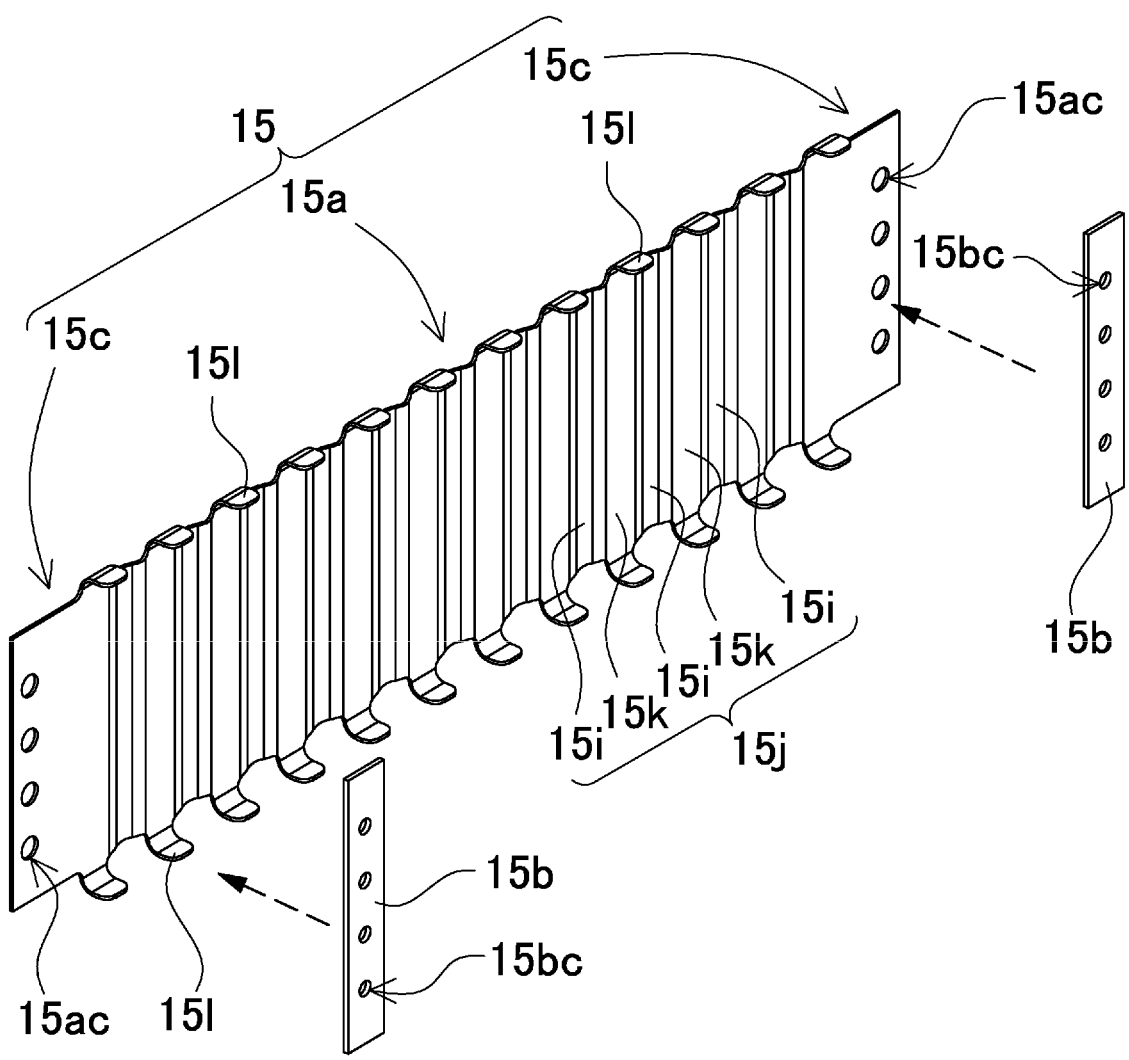
FIG. 11 is an exploded perspective view of the bind bar of FIG. 10.

FIGS. 1 to 11 each illustrate power supply device 100 according to a first exemplary embodiment of the present invention. In these drawings, FIG. 1 is a perspective view illustrating power supply device 100 according to the first embodiment, FIG. 2 is an exploded perspective view of power supply device 100 in FIG. 1, FIG. 3 is an enlarged perspective view of a main part of power supply device 100 in FIG. 1, FIG. 4 is a plan view of power supply device 100 in FIG. 1, FIG. 5 is a plan view and an enlarged plan view of a main part of power supply device 100 in FIG. 4 in which insulating sheet 30 is not illustrated, FIG. 6 is a horizontal sectional view taken along line VI-VI of power supply device 100 in FIG. 1, FIG. 7 is a vertical sectional view taken along line VII-VII of power supply device 100 in FIG. 1, FIG. 8 is a side view of power supply device 100 in FIG. 1, FIG. 9 is a perspective view illustrating bind bar 15 in FIG. 2, FIG. 10 is a perspective view illustrating bind bar 15 in FIG. 9 viewed from the rear, and FIG. 11 is an exploded perspective view of bind bar 15 in FIG. 10. Power supply device 100 illustrated in these drawings includes battery stack 10 in which battery cells 1 are stacked, end plates 20 paired covering both side end surfaces of battery stack 10, bind bars 15 for joining end plates 20 to each other, and insulating sheet 30 that is insulative and interposed between each of bind bars 15 and battery stack 10.

(Battery Stack 10)

As illustrated in FIGS. 1 and 2, battery stack 10 includes battery cells 1 each including positive and negative electrode terminals 2, and bus bars (not illustrated) connected to respective electrode terminals 2 of each of battery cells 1 to connect battery cells 1 in parallel and in series. Battery cells 1 are connected in parallel or in series through these bus bars. Battery cells 1 are each a chargeable and dischargeable secondary battery. Power supply device 100 includes battery cells 1 that are connected in parallel to form a parallel battery group, and parallel battery groups are connected in series to allow many battery cells 1 to be connected in parallel and in series. FIGS. 1 to 3 each illustrates power supply device 100 that includes battery stack 10 formed by stacking battery cells 1. Battery stack 10 has opposite end surfaces on which respective end plates 20 paired are disposed. End plates 20 are each fixed to end portions of respective bind bars 15 to fix battery cells 1 stacked in a pressed state. Bind bars 15 each include pressing piece 15*l* for disposing battery cell 1 at a predetermined position, and this pressing piece 15*l* presses an upper surface of battery cell 1 with elastomer molding 18 interposed therebetween to dispose battery cell 1 at the predetermined position.

(Battery Cell 1)

Battery cell 1 is a prismatic battery that has a main surface in a prismatic outer shape, which is a wide surface, and that has a constant cell thickness while being smaller in thickness than in width. Battery cell 1 is a secondary battery that can be charged and discharged, and is a lithium ion secondary battery. However, the battery cell is not particularly limited to a prismatic battery in the present invention, and is also not particularly limited to a lithium ion secondary battery. As the battery cell, all rechargeable batteries such as a non-aqueous electrolyte secondary battery other than the lithium ion secondary battery, and a nickel hydride battery cell can also be used.

As illustrated in FIGS. 2 to 7, battery cell 1 includes outer covering can 1*a* that accommodates an electrode assembly formed by stacking positive and negative electrode plates, and that is filled with an electrolyte solution and hermetically sealed. Exterior can 1*a* is formed into a rectangular tubular shape with a closed bottom, and has an upper opening that is airtightly closed by sealing plate 1*b* of a metal sheet. Exterior can 1*a* is formed by deep drawing using a metal sheet made of aluminum, an aluminum alloy, or the like. Sealing plate 1*b* is formed using a metal sheet made of aluminum, an aluminum alloy, or the like, as with outer covering can 1*a*. Sealing plate 1*b* is inserted into the upper opening of outer covering can 1*a*, and then a boundary between an outer periphery of sealing plate 1*b* and an inner periphery of outer covering can 1*a* is irradiated with laser light to fix sealing plate 1*b* to outer covering can 1*a* in an airtight manner by laser welding.

(Electrode Terminal 2)

As illustrated in FIGS. 3 to 5, for example, battery cell 1 includes sealing plate 1*b* serving as a top surface that is used as terminal surface 1X, and terminal surface 1X has opposite end portions to which respective positive and negative electrode terminals 2 are fixed. Electrode terminals 2 each has a protrusion in a cylindrical columnar shape. However, the protrusion is not necessarily in a columnar shape, and may be in a polygonal columnar shape or an elliptic columnar shape.

Positive and negative electrode terminals 2 are fixed to sealing plate 1*b* of battery cell 1 at respective positions to allow a positive electrode and a negative electrode to be bilateral symmetry. As illustrated in FIGS. 3 to 5, for example, this placement enables adjacent battery cells 1 to be connected in series by alternately and laterally inverting battery cells 1 and stacking them, and connecting electrode terminals 2 of the positive electrode and the negative electrode that are adjacent and close to each other with a bus bar. The present invention does not specify the number of battery cells constituting the battery stack and a connection state of the battery cells. The number of battery cells constituting the battery stack and the connection state of the battery cells may be modified in various manners, inclusive of other exemplary embodiments to be described later.

(Battery Stack 10)

Battery cells 1 are stacked in a stacking direction to form battery stack 10, the stacking direction being a thickness direction of each battery cell 1. Battery stack 10 is formed by stacking battery cells 1 such that terminal surfaces 1X each provided with positive and negative electrode terminals 2 are flush with each other, terminal surfaces 1X being each sealing plate 1*b* in FIGS. 1 to 6.

Battery stack 10 may include insulating spacer 16 interposed between battery cells 1 stacked adjacent to each other. Insulating spacer 16 is formed in the shape of a thin plate or a sheet by using an insulating material such as resin. Insulating spacer 16 is in the shape of a plate that is substantially equal in size to an opposing surface of battery cell 1. Stacking this insulating spacer 16 between battery cells 1 adjacent to each other enables adjacent battery cells 1 to be insulated. Available examples of the spacer disposed between adjacent battery cells include a spacer having a shape allowing a flow path of a cooling gas to be formed between the battery cell and the spacer. The surface of the battery cell can also be covered with an insulating material. For example, a shrink tube such as a polyethylene terephthalate (PET) resin may be applied by thermal welding to the surface of the outer covering can except for electrode portions of the battery cell. In this case, the insulating spacer may be eliminated. Although a power supply device including battery cells connected in parallel and series includes an insulating spacer interposed between the battery cells connected in series, the insulating spacer between the battery cells connected in parallel can be eliminated because no voltage difference occurs between adjacent outer covering cans.

Power supply device 100 illustrated in FIG. 2 includes end plates 20 disposed on respective opposite end surfaces of battery stack 10. Between each of end plates 20 and battery stack 10, end face spacer 17 may be interposed to insulate them. End face spacer 17 can also be formed in the shape of a thin plate or a sheet by using an insulating material such as resin.

Power supply device 100 according to the first exemplary embodiment includes battery stack 10 in which battery cells 1 are stacked on each other, and electrode terminals 2 of respective battery cells 1 adjacent to each other are connected by bus bars 3 to connect battery cells 1 in parallel and in series. Between battery stack 10 and each of the bus bars, a bus bar holder may be disposed. Using the bus bar holder enables the bus bars to be disposed at respective predetermined positions on an upper surface of the battery stack while insulating the bus bars from each other and insulating terminal surfaces of the respective battery cells from the bus bars.

The bus bar is manufactured in a predetermined shape by cutting and processing a metal sheet. The metal sheet constituting the bus bar is made of a metal having low electrical resistance and light weight, and can be formed by using, for example, an aluminum plate, a copper plate, or an alloy thereof. As the metal sheet for the bus bar, a sheet of another metal light in weight and low in electrical resistance or a sheet of an alloy of the metal also can be used.

(End Plate 20)

As illustrated in FIGS. 1 to 3, end plates 20 are disposed at respective opposite ends of battery stack 10 and are joined to each other using bind bars 15 that are paired right and left and are disposed along both side surfaces of battery stack 10. End plates 20 are disposed outside end face spacers 17 on the respective opposite ends of battery stack 10 in the stacking direction of battery cells 1 to sandwich battery stack 10 from the respective opposite ends.

(Step 20b)

End plates 20 are each provided with step 20b to lock locking block 15b provided on each of bind bars 15 while being joined by bind bars 15. Step 20b is formed in a size and a shape that enable locking block 15b of bind bar 15, which is described later, to be locked. In the example of FIG. 2, step 20b in the shape of a flange is formed allowing end plate 20 to be in a T-shape in a horizontal sectional view. Near step 20b, end plate screw hole 20c is opened.

(Bind Bar 15)

Bind bars 15 each have opposite ends fixed to end plates 20 disposed on respective opposite end surfaces of battery stack 10. End plates 20 are fixed by bind bars 15 to fasten battery stack 10 in the stacking direction. As illustrated in FIGS. 9 to 11, for example, bind bars 15 are each made of metal having a predetermined width and a predetermined thickness along the side surface of battery stack 10, and are disposed to face the corresponding side surfaces of battery stack 10.

Bind bar 15 includes joints 15c at respective opposite ends in the longitudinal direction to be fixed to respective end plates 20, intermediate part 15a connecting between joints 15c, and pressing pieces 15l provided on both upper and lower edges of intermediate part 15a. Bind bar 15 in FIGS. 9 to 11 is provided on its both upper and lower side edges with pressing pieces 15l, and both sides of battery cell 1 are each vertically sandwiched between pressing pieces 15l to dispose battery cell 1 at a predetermined position. However, power supply device 100 of the present invention may be provided with pressing pieces 15l only on the upper edge of bind bar 15, and a lower plate (not illustrated) of a thick metal sheet may be disposed below battery cells 1. Then, battery cells 1 may be placed on the lower plate to sandwich battery cells 1 with the lower plate and pressing pieces 15l from below and above, so that battery cells 1 can be disposed at respective predetermined positions. The lower plate is fixed to bind bars 15 and end plates 20, and is disposed at a predetermined position.

Bind bar 15 preferably has a structure in which joint 15c, intermediate part 15a, and pressing pieces 15l are integrally connected to form an integrated structure with a metal sheet. In the example of FIG. 9 and the like, the metal sheet is bent to form corrugated part 15j in intermediate part 15a, and upper and lower end edges of intermediate part 15a are bent to form pressing pieces 15l. As illustrated in FIGS. 3 and 5, for example, corrugated part 15j includes corrugated pieces 15i and flat pieces 15k. Corrugated pieces 15i are connected to each other with flat piece 15k interposed therebetween.

Then, joint 15c of bind bar 15 has a part provided with locking block 15b as illustrated in FIG. 11, and is increased in thickness in this part. This locking block 15b is locked to step 20b of end plate 20, and bind bar 15 is fixed to end plate 20 by screwing or the like. The structure in which locking block 15b of bind bar 15 is locked to step 20b of end plate 20 enables bind bar 15 subjected to strong tensile stress to be firmly connected to end plate 20. Although not illustrated, bind bar 15 can be fixed in a structure in which its opposite edges in the longitudinal direction are bent inward, and the bent edges are each screwed to an outer surface of end plate 20.

(Insulating Sheet 30)

Insulating sheet 30 is interposed between bind bar 15 and battery stack 10. Insulating sheet 30 is made of a material having insulating properties, such as resin, and insulates bind bar 15 made of metal from battery cell 1. Insulating sheet 30 illustrated in FIG. 2 and the like includes flat plate 31 for covering the side surface of battery stack 10, and pressing piece supports 32 provided up and down flat plate 31. Pressing piece support 32 is interposed between each pressing piece 15l of bind bar 15 and the upper surface of battery cell 1 to insulate pressing piece 15l from battery cell 1. Pressing piece support 32 is provided for each of pressing pieces 15l formed on bind bar 15. Thus, pressing piece supports 32 are formed at a pitch identical to a pitch at which pressing pieces 15l of bind bar 15 are formed. Insulating sheet 30 may be configured to serve also as the bus bar holder described above that holds the bus bar.

The insulating sheet can be unnecessary when the battery stack or the surface of the battery stack is insulated, when the battery cell is, for example, housed in an insulating case or covered with a heat-shrinkable tube made of resin, when the bind bar has a surface coated with an insulating paint or coating, or when the bind bar is made of an insulating material, for example.

(Corrugated Part 15j)

Intermediate part 15a has corrugated part 15j formed in a corrugated shape. Corrugated part 15j includes corrugated pieces 15i that are formed periodically at a pitch corresponding to the cell thickness of battery cell 1. Even when battery stack 10 expands, forming intermediate part 15a in a spring shape to provide springiness to each corrugated piece 15i enables corrugated part 15j to be deformed to follow the expansion and allow intermediate part 15a to be displaced, and thus enabling avoidance of a situation in which stress concentrates on bind bar 15 to break bind bar 15. When battery stack 10 returns from the expanded state, corrugated part 15j deforms in response to the return, and returns to an original shape. This maintains a joint state of battery stack 10 with bind bars 15. As described above, bind bar 15 including corrugated part 15j can be deformed in accordance with change of battery stack 10 in the stacking direction, and can maintain the joint state.

Figure 12:
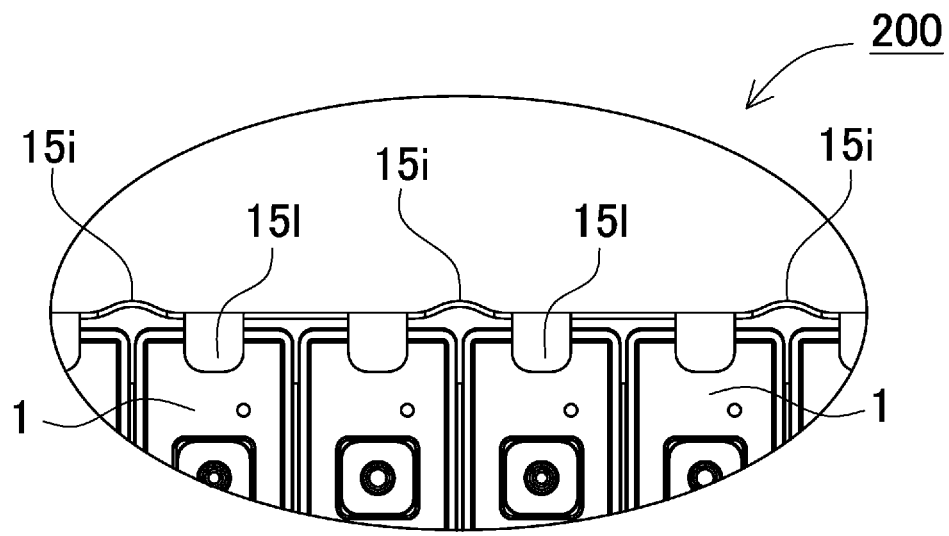
FIG. 12 is an enlarged plan view of a main part of a power supply device according to a second exemplary embodiment in which an insulating sheet is not illustrated.

At least one corrugated piece 15i is formed for each of battery cells 1. As illustrated in the enlarged plan view of FIG. 5 and the like, corrugated piece 15i is preferably formed for each battery cell 1 of battery stack 10. This enables deformation of the outer covering can of each battery cell 1 to be individually addressed. However, the corrugated piece is not necessarily formed for each battery cell, and corrugated piece 15i may be formed for every other battery cell, i.e., every two battery cells, for example, as in a plan view of power supply device 200 according to a second exemplary embodiment, in which an insulating sheet is not illustrated, illustrated in FIG. 12. Corrugated pieces 15i are formed at a pitch that is appropriately designed according to the specification of the battery cell, battery capacity, expected use environment (temperature, humidity, and the like) of the power supply device, the expected amount of deformation of the outer covering can, and the like. As illustrated in FIG. 5, corrugated piece 15i is bent in a chevron shape outside battery stack 10 in a direction in which battery stack 10 expands. Protruding corrugated piece 15i outward as described above enables avoidance of a situation in which corrugated piece 15i interferes with battery stack 10.

Each corrugated piece 15i may be formed in the shape of chevrons other than the shape of one chevron. Besides a curved state, a zigzag shape, a bellows shape, an accordion shape, and the like are available. Corrugated pieces 15i may not be identical in shape, and may be changed in shape according to position.

Although bind bar 15 in FIGS. 8 to 11 includes intermediate part 15a that is corrugated part 15j, bind bar 15 may include intermediate part 15a in a planar shape. Bind bar 15 including intermediate part 15a that is corrugated part 15j can smoothly absorb expansion of battery cells 1. Bind bar 15 including intermediate part 15a in a planar shape can prevent positional displacement of battery cells in the stacking direction by suppressing the expansion of battery cells 1.

(Pressing Piece 15l)

Bind bars 15 disposed on both sides of battery stack 10 are provided with pressing pieces 15l that press upper surfaces of respective battery cells 1 constituting battery stack 10. Bind bar 15 in FIGS. 9 to 11 is provided with pressing pieces 15l that independently and separately press respective battery cells 1. Pressing pieces 15l for pressing respective battery cells 1 independently have a feature in that all battery cells 1 can be pressed in an ideal state and disposed at respective predetermined positions. Pressing pieces 15l can press the upper surfaces of respective battery cells 1 independently when pressing pieces 15l each have a narrower lateral width than the upper surface of each battery cell 1. Alternatively, the pressing piece may be formed in a shape that allows pressing upper surfaces of battery cells. A pressing piece by itself for pressing upper surfaces of battery cells has a wide width to press the upper surfaces of the battery cells. Additionally, a pressing piece by itself can press upper surfaces of all battery cells constituting a battery stack to dispose all the battery cells at respective predetermined positions. In particular, power supply device 100 illustrated in FIG. 13 includes pressing piece 15l that presses the upper surface of each battery cell 1 with elastomer molding 18 interposed therebetween to dispose battery cell 1 at a predetermined position, so that one pressing piece 15l itself can press the upper surfaces of all battery cells 1 to dispose all battery cells 1 at respective predetermined positions. In contrast, power supply device 100 including pressing pieces 15l that independently press respective battery cells 1 enables battery cells 1 to be disposed at respective predetermined positions in an ideal state.

Pressing piece 15l is provided integrally with bind bar 15 by bending a metal sheet. As illustrated in the vertical sectional view of FIG. 7 and the enlarged sectional view of the main part of FIG. 13, pressing piece 15l presses the upper surface of battery cell 1 with elastomer molding 18 and insulating sheet 30 that are interposed between pressing piece 15l and the upper surface. This structure causes each battery cell 1 to be pressed by elastomer molding 18 and pressing piece 15l, and thus suppressing positional displacement in a height. In particular, battery cell 1 is held in a pressed state using elastomer molding 18, so that each battery cell 1 can be held by being prevented from being displaced vertically even under vibration, impact, or the like.

As illustrated in FIGS. 9 to 11, bind bar 15 including intermediate part 15a, which is corrugated part 15j, is preferably configured such that pressing piece 15l is provided at a position different from a position of corrugated piece 15i. FIGS. 3, 5, and the like each illustrate an example in which pressing piece 15l is formed on flat piece 15k located between corrugated pieces 15i. This enables avoiding a situation in which pressing piece 15l bent from intermediate part 15a obstructs deformation of corrugated piece 15i and effectively exerting the springiness of corrugated piece 15i.

Bind bar 15 can be made of a metal sheet made of iron or the like, preferably a steel sheet, or can be made of iron, an iron alloy, SUS, aluminum, an aluminum alloy, or the like. Bind bar 15 may be made of a single member with joint 15c and intermediate part 15a that are different in thicknesses from each other. Alternatively, joint 15c may be made of a first metal, and intermediate part 15a may be made of a second metal different from the first metal. In this case, the first metal has higher rigidity than the second metal, and the second metal has higher stretchability than the first metal. Selection of dissimilar metal enables providing rigidity to joint 15c and stretchability to intermediate part 15a.

(Locking Block 15b)

As illustrated in FIGS. 9 to 11, bind bar 15 includes intermediate part 15a, joints 15c, and locking blocks 15b each in the shape of a block. Intermediate part 15a is a plate-shaped member, and has opposite ends in its longitudinal direction to which respective joints 15c are joined. Locking block 15b is fixed to an inner surface of joint 15c near its end edge. Locking block 15b is in a plate shape having a predetermined thickness, and is fixed in an attitude protruding inward of joint 15c. Bind bar 15 connected to end plates 20 is locked to steps 20b provided on respective end plates 20 to dispose bind bar 15 at a predetermined position on each side of battery stack 10. Locking block 15b is fixed to joint 15c by welding such as spot welding or laser welding.

Locking block 15b illustrated in the drawing has joint-side through-hole 15bc that is opened to align with end plate screw hole 20c when end plate 20 is joined to locking block 15b. Joint 15c has joint main surface-side through-hole 15ac opened at a position corresponding to joint-side through-hole 15bc. Joint-side through-hole 15bc and joint main surface-side through-hole 15ac are designed to align with each other when locking block 15b is fixed to joint 15c.

Multiple joint-side through-holes 15bc opened in locking block 15b are opened in an extending direction of locking block 15b. Similarly, joint main surface-side through-holes 15ac are opened along the end edge of joint 15c or in the extending direction of locking block 15b. Multiple end plate screw holes 20c are also formed along a side surface of end plate 20 accordingly.

Locking block 15b is fixed to an outer peripheral surface of end plate 20 with bolts 15f. The fixing of bind bar 15, locking block 15b, and end plate 20 is not necessarily limited to the screwing using the bolts, and may use a pin, a rivet, or the like.

As described above, intermediate part 15a, joint 15c, and locking block 15b, which constitute bind bar 15, each can be made of iron, an iron alloy, SUS, aluminum, an aluminum alloy, or the like. Locking block 15b can have a width of 10 mm or more in the stacking direction of the battery. End plate 20 can be made of metal. Locking block 15b and joint 15*c* are preferably made of the same metal. This facilitates welding between locking block 15*b* and joint 15*c*.

As described above, bind bar 15 is not bent at its left and right ends in the longitudinal direction, i.e., at its opposite ends in the stacked layer direction of battery stack 10 and is not screwed to end plate 20 from its main surface side. Alternatively, as illustrated in FIGS. 1 to 3, bind bar 15 is formed in a flat plate shape in the stacking direction of battery stack 10 without providing a bent part, and fastens battery stack 10 by screwing using a locking structure formed by step 20*b* of end plate 20 and locking block 15*b*, thereby increasing rigidity to enable reducing a risk of breakage or the like due to expansion of battery cells 1.

A power supply device including many battery cells 1 stacked is configured such that battery stack 10 composed of battery cells 1 is provided at opposite ends with respective end plates 20, and bind bars 15 are coupled to end plates 20 to bind battery cells 1. Binding battery cells 1 with end plate 20 and bind bar 15, which have high rigidity, enables suppressing expansion, deformation, relative movement, damage due to vibration, and the like of battery cells 1 due to charging and discharging, and degradation.

As described above, power supply device 100 according to the present exemplary embodiment has stress generated by expansion of battery cells 1. The stress acts for expansion in the stacking direction of battery and is applied not only to joint 15*c* itself but also to members related to: locking between step 20*b* and locking block 15*b*; welding between joint 15*c* and locking block 15*b*; and screwing with bolt 15*f*. Thus, increasing rigidity of each of the members to appropriately disperse the stress enables increasing rigidity of power supply device 100 as a whole and fabricating power supply device 100 capable of addressing expansion and contraction of battery cells 1. Additionally, corrugated part 15*j* including corrugated piece 15*i* is deformed in accordance with expansion of battery cells 1, and thus enables addressing displacement of battery stack 10.

(Elastomer Molding 18)

Elastomer molding 18 is disposed between pressing piece 15*l* and the upper surface of battery cell 1, and elastically presses the upper surface of battery cell 1 to dispose battery cell 1 at a predetermined position. Elastomer molding 18 is formed by molding a polymer elastomer having elasticity. As the elastomer, a thermoplastic elastomer or a thermosetting elastomer can be used. As the thermoplastic elastomer, one selected from a polyamide-based elastomer, a polyurethane-based elastomer, a polyolefin-based elastomer, a polyester-based elastomer, a styrene-based elastomer, a vinyl chloride-based elastomer, and a fluorine-based elastomer can be used alone, or a combination of two or more thereof can be used. The thermosetting elastomer is synthetic rubber such as urethane rubber, silicone rubber, and fluorocarbon rubber, or natural rubber. Elastomer molding 18 can control pressing force for pressing the upper surface of battery cell 1 by being adjusted for hardness. Elastomer molding 18 has hardness, for example, from 30 degrees to 80 degrees inclusive, preferably from 40 degrees to 80 degrees inclusive, and the hardness is set optimally in consideration of an area where elastomer molding 18 presses the upper surface of battery cell 1, strength of the upper surface of battery cell 1, and the like.

Figure 13:
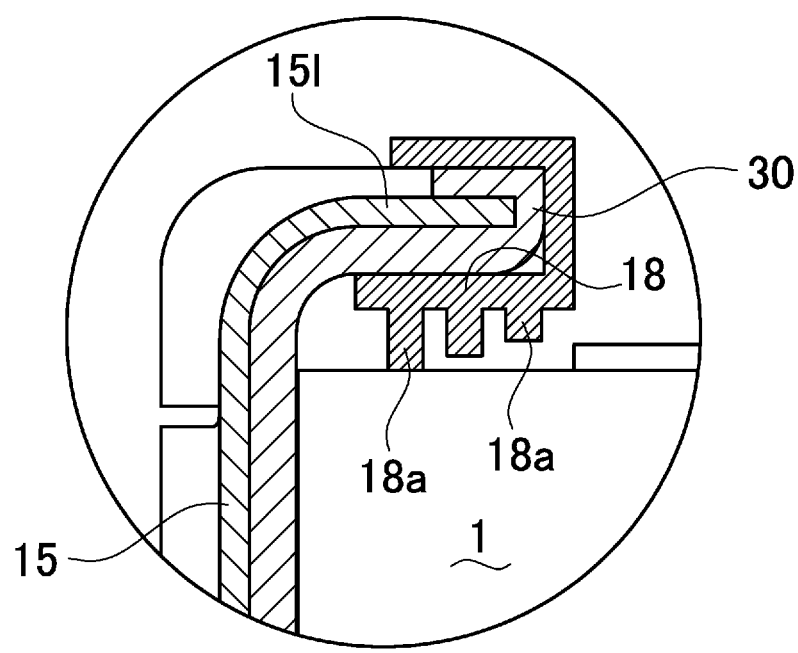
FIG. 13 is an enlarged sectional view of a main part of the power supply device of FIG. 7.

Elastomer molding 18 illustrated in the sectional view of FIG. 13 is formed by being molded into the shape of a groove holding upper and lower surfaces of pressing piece 15*l*. Elastomer molding 18 in the drawing is molded into the shape of the groove in which both pressing piece 15*l* and insulating sheet 30 are disposed inside. Insulating sheet 30 is disposed on an inner surface of the groove, and pressing piece 15*l* is disposed inside insulating sheet 30. As illustrated in FIG. 4, elastomer molding 18 is molded into a shape coupled to pressing pieces 15*l* adjacent to each other, or is molded into a shape separately and independently coupled to each pressing piece 15*l*. Elastomer molding 18 molded into the shape of the groove and having pressing piece 15*l* disposed inside has a feature in that elastomer molding 18 can be coupled to pressing piece 15*l* without positional displacement.

Elastomer molding 18 illustrated in FIG. 13 is provided with rubbery pressing part 18*a* protruding from a pressing surface covering the lower surface of pressing piece 15*l* toward the upper surface of battery cell 1. Rubbery pressing part 18*a* is in a columnar shape or a plate shape that locally presses the upper surface of battery cell 1. Rubbery pressing part 18*a* has a leading end that is in a planar shape in surface contact with the upper surface of battery cell 1, and presses the upper surface of battery cell 1 with a predetermined area. Elastomer molding 18 of FIG. 13 is provided with rubbery pressing parts 18*a* different in protrusion height. Elastomer molding 18 provided with rubbery pressing parts 18*a* different in height can reliably dispose each battery cell 1 at a predetermined position by pressing the upper surface of battery cell 1. This is because rubbery pressing part 18*a* protruding high presses the upper surface of battery cell 1 with a wide gap between the upper surface of battery cell 1 and pressing piece 15*l*, and many rubbery pressing parts 18*a* press the upper surface of battery cell 1 with a narrow gap between pressing piece 15*l* and the upper surface of battery cell 1, thereby disposing battery cells 1 at respective predetermined positions.

Elastomer molding 18 having rubbery pressing parts 18*a* different in protrusion height is configured such that rubbery pressing part 18*a* protruding high is formed in a shape that deforms itself in a bent manner, i.e., deforms resulting in buckling, in a state where rubbery pressing part 18*a* protruding high is strongly crushed and compressed on the upper surface of battery cell 1, thereby disposing battery cell 1 at a predetermined position without pressing the upper surface of battery cell 1 under too strong pressure. This is because rubbery pressing part 18*a* is buckled to suppress an increase in pressing force. Elastomer molding 18 illustrated in the sectional view of FIG. 13 includes rubbery pressing parts 18*a* different in protrusion height that are disposed side by side in the longitudinal direction of the upper surface of battery cell 1, and rubbery pressing parts 18*a* each having a high protrusion height that are disposed on the upper surface of battery cell 1 on respective opposite end. Battery cell 1 is manufactured by laser welding sealing plate 1*b* to an elongated upper end opening of outer covering can 1*a* formed by deep drawing a metal sheet. Battery cell 1 having this structure is configured such that sealing plate 1*b* has opposite end parts in each of which both side edges and an end edge are laser-welded, and an intermediate part in which only both sides are laser-welded, thereby coupling sealing plate 1*b* to outer covering can 1*a* and increasing bending strength at the opposite end parts of sealing plate 1*b*. Elastomer molding 18 including rubbery pressing parts 18*a* each having a high protrusion height, which are disposed in the respective opposite end parts of sealing plate 1*b*, strongly press the respective opposite end parts of sealing plate 1*b*, and can suppress damage to battery cell 1 due to a pressing force while disposing battery cell 1 at a predetermined position.

Second Exemplary Embodiment

Figure 14:
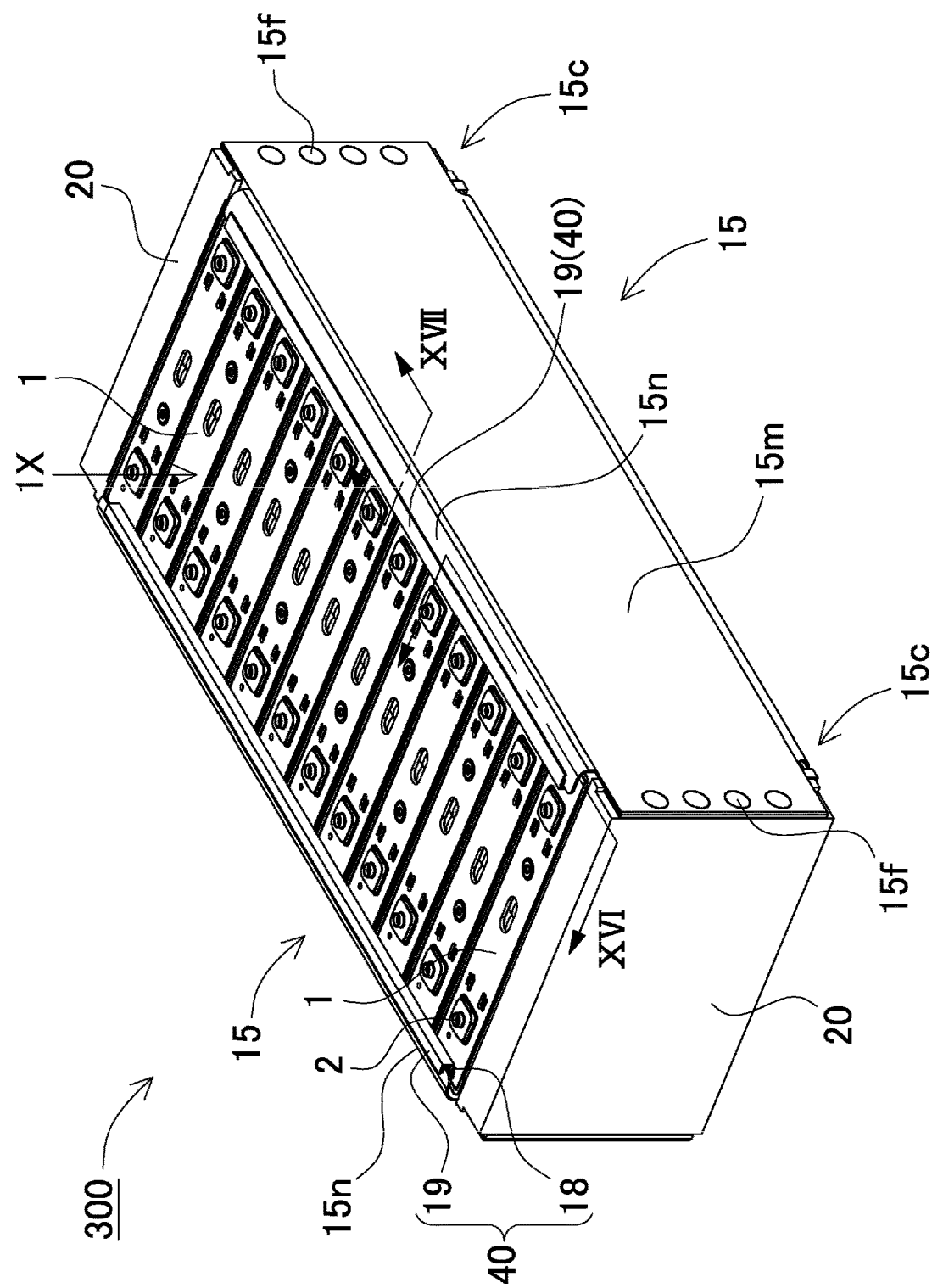
FIG. 14 is a perspective view illustrating the power supply device according to the second exemplary embodiment.
Figure 15:
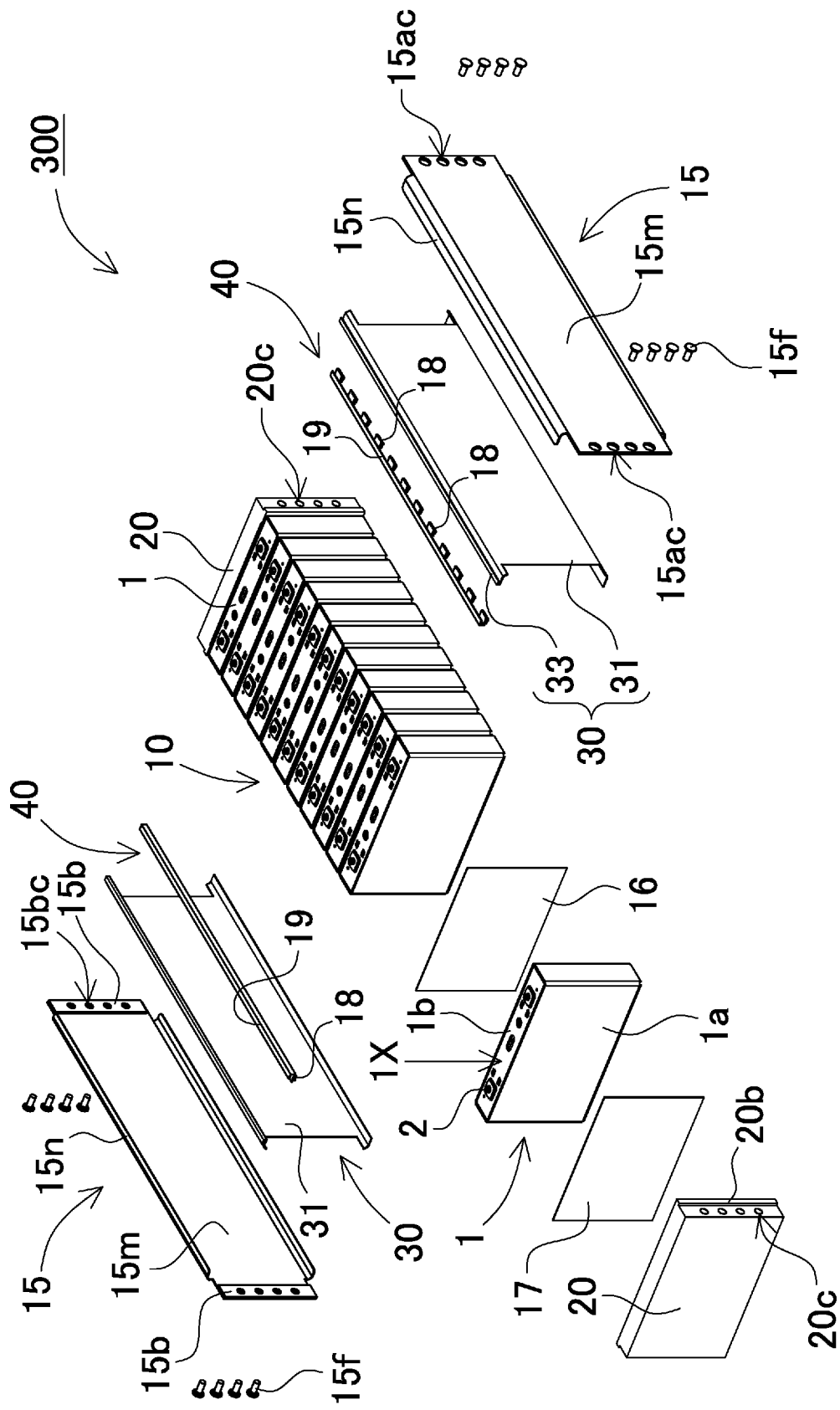
FIG. 15 is an exploded perspective view of the power supply device of FIG. 14.

Power supply device 300 according to a second exemplary embodiment of the present invention is illustrated in FIGS. 14 and 15. In these drawings, FIG. 14 is a perspective view of power supply device 300, and FIG. 15 is an exploded perspective view of power supply device 300 of FIG. 14. Power supply device 300 illustrated in these drawings includes bind bar 15 configured to press upper surfaces of all battery cells 1 constituting battery stack 10 with one pressing piece 15n, and elastomer moldings 18 disposed between the upper surfaces of respective battery cells 1 and pressing piece 15n to independently press respective battery cells 1. Thus, power supply device 300 is different from power supply device 100 of the first exemplary embodiment described above in structure of bind bar 15, insulating sheet 30, and elastomer molding 18. Other configuration elements are identical in structure to the exemplary embodiment described above, so that the configuration elements are denoted by the same reference numerals as those of the exemplary embodiment described above, and the detailed description thereof will be eliminated.

(Bind Bar 15)

Bind bar 15 illustrated in FIGS. 14 and 15 includes intermediate part 15m that is in a planar shape instead of a corrugated shape. Bind bar 15 including intermediate part 15m in a planar shape can prevent positional displacement of battery cells 1 in the stacking direction by suppressing the expansion of battery cells 1. Bind bar 15 in the drawing also includes pressing pieces 15n formed by bending upper and lower end edge parts of intermediate part 15m in a planar shape toward battery stack 10 into an L shape. Bind bar 15 illustrated in the drawing is configured such that pressing piece 15n has a total length substantially equal to a length of battery stack 10 in the stacking direction to press the upper surfaces of all battery cells 1 constituting battery stack 10 with one pressing piece 15n. The structure described above in which the upper surfaces of all battery cells 1 constituting battery stack 10 are pressed by one pressing piece 15n has a feature in that bind bar 15 can be manufactured with a simple structure at low cost. Here, when the upper surfaces of all battery cells 1 are pressed by one pressing piece 15n, there is a concern that all battery cells 1 cannot be reliably disposed at respective predetermined positions by pressing piece 15n due to a dimensional error or the like of battery cell 1. However, the power supply device of the present invention allows pressing piece 15n to press the upper surfaces of respective battery cells 1 with respective elastomer moldings 18 interposed therebetween, so that the dimensional error of battery cell 1 can be absorbed by elastomer molding 18 and all battery cells 1 can be disposed at the respective predetermined positions.

(Insulating Sheet 30)

Insulating sheet 30 interposed between bind bar 15 and battery stack 10 includes flat plate 31 for covering the side surface of battery stack 10, and pressing piece covering parts 33 provided up and down flat plate 31. Pressing piece covering part 33 is bent from flat plate 31 into an L-shape covering an inner surface of pressing piece 15n of bind bar 15. As a result, the entire inner surface of bind bar 15 is covered with insulating sheet 30.

(Elastomer Molding 18)

Figure 16:
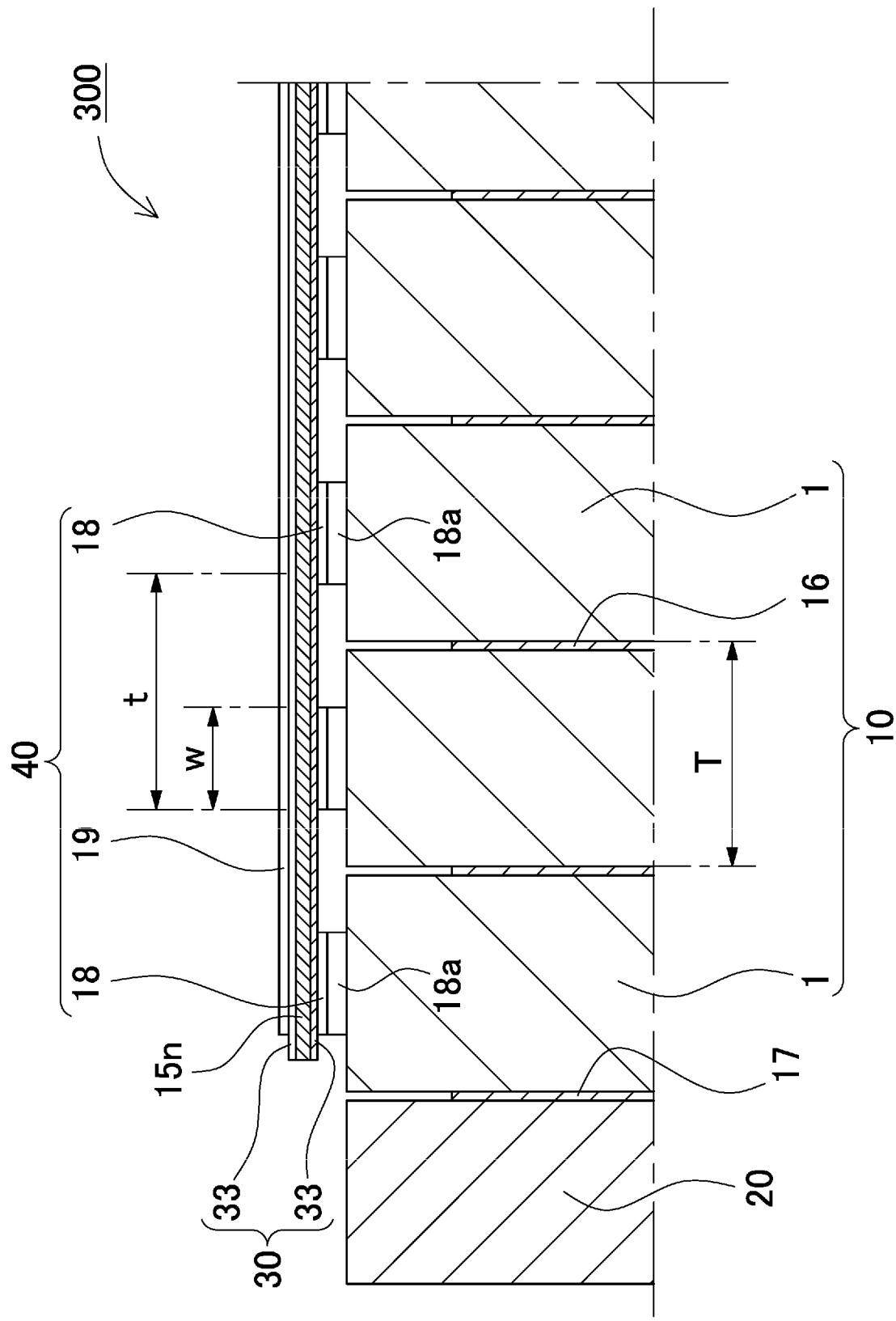
FIG. 16 is an enlarged sectional view taken along line XVI-XVI of the power supply device of FIG. 14.

Power supply device 300 illustrated in FIG. 15 includes elastomer moldings 18 that are disposed between pressing piece 15n and the upper surfaces of respective battery cells 1, and that independently press respective battery cells 1. As illustrated in FIG. 16, elastomer moldings 18 are disposed facing the respective upper surfaces of all battery cells 1 constituting battery stack 10. Then as illustrated in FIGS. 16 and 17, pressing pieces 15n disposed above the upper surface of the battery stack on respective opposite sides press respective opposite end parts of the upper surfaces of respective battery cells 1 with respective elastomer moldings 18 interposed therebetween to dispose respective battery cells 1 at predetermined positions.

Figure 17:
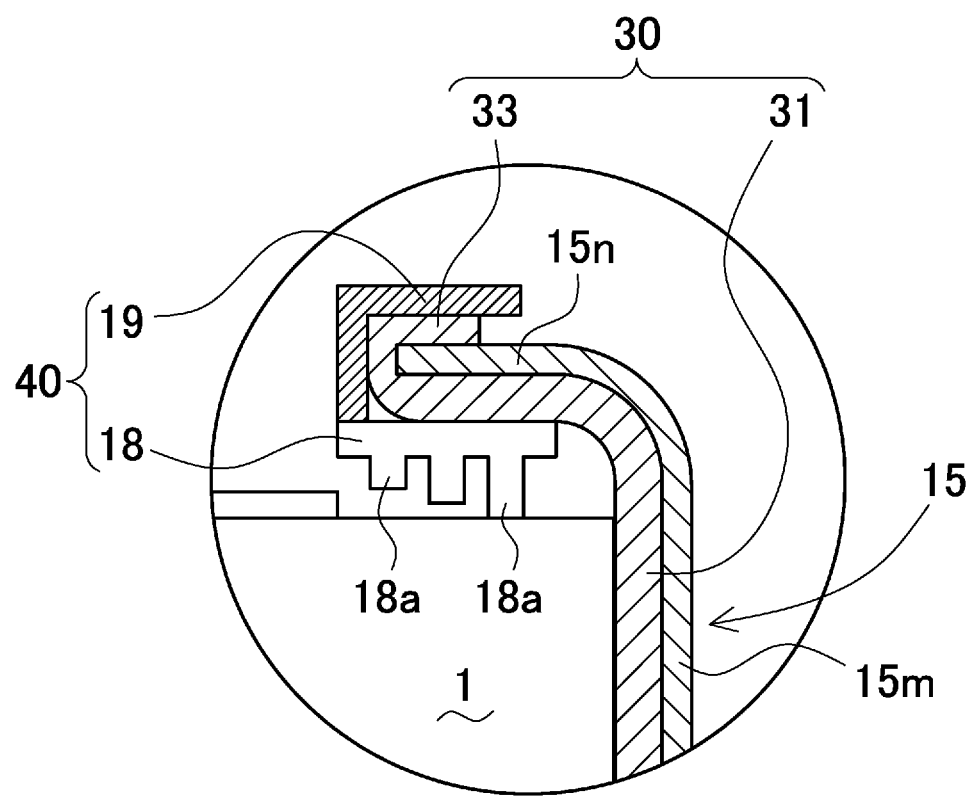
FIG. 17 is an enlarged sectional view taken along line XVII-XVII of the power supply device of FIG. 14.
Figure 18:
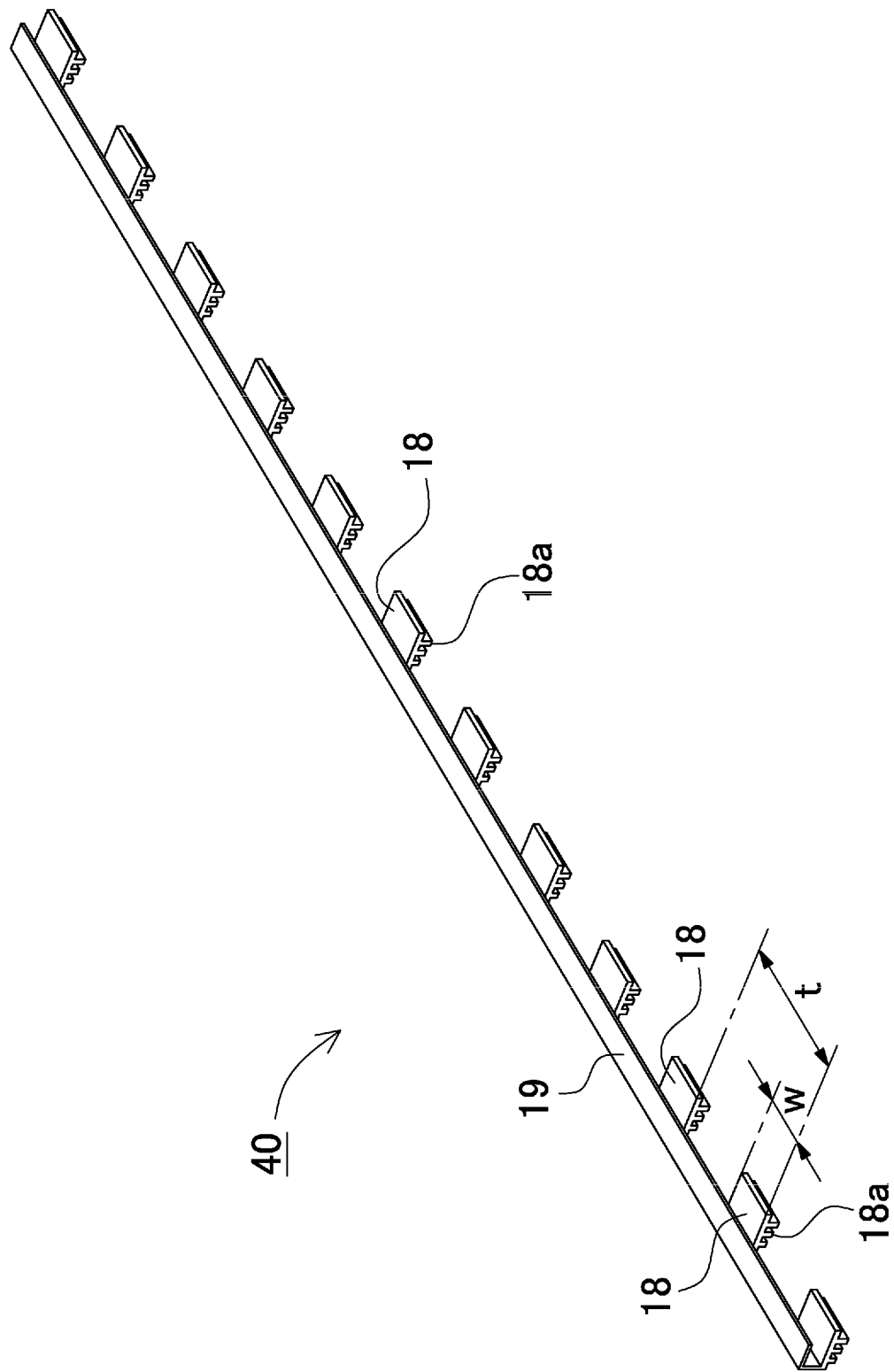
FIG. 18 is an enlarged perspective view illustrating an example of an elastomer unit.

As illustrated in FIGS. 16 to 18, elastomer moldings 18 are connected to each other at predetermined intervals using coupling part 19 while being disposed at predetermined positions on the upper surfaces of the respective battery cells 1 constituting battery stack 10. In the example illustrated in FIG. 18, elastomer moldings 18 and coupling part 19 are integrally molded with a polymer elastomer having elasticity to form elastomer unit 40. Elastomer unit 40 of FIGS. 17 and 18 is molded in a groove shape holding upper and lower surfaces of pressing piece 15n between elastomer moldings 18 disposed facing the upper surfaces of respective battery cells 1 and coupling part 19 having an inverted L-shape in a cross section coupled to one ends of respective elastomer moldings 18. Elastomer unit 40 of FIG. 17 is molded into the shape of a groove in which both pressing piece 15n and insulating sheet 30 are disposed inside, the groove being formed by elastomer molding 18 and coupling part 19. Insulating sheet 30 is disposed on an inner surface of the groove, and pressing piece 15n is disposed inside insulating sheet 30. As described above, the structure in which elastomer moldings 18 are coupled to each other by coupling part 19 has a feature in that elastomer moldings 18 can be disposed at respective predetermined positions on the upper surfaces of respective battery cells 1 while being efficiently connected to pressing piece 15n. However, elastomer moldings each can be molded into the shape of a groove holding upper and lower surfaces of the pressing piece instead of being integrally coupled, and can be disposed at a predetermined position with respect to the pressing piece.

Elastomer unit 40 of FIGS. 16 and 18 includes elastomer moldings 18 that each have lateral width (w) set to a predetermined width and that are disposed at equal intervals and at predetermined pitch (t) such that elastomer moldings 18 can be disposed facing the upper surfaces of respective battery cells 1 adjacent to each other. When lateral width (w) of each elastomer molding 18 is too wide, a position of elastomer molding 18 facing the upper surface of battery cell 1 that contracts in the stacking direction is shifted at the time of discharging battery cell 1, and thus the upper surface of battery cell 1 cannot be accurately pressed. In contrast, when lateral width (w) is too narrow, the upper surface of battery cell 1 cannot be pressed with a sufficient pressing force. Thus, lateral width (w) of each elastomer molding 18 is set to 0.3 times to 0.8 times, preferably 0.4 times to 0.7 times, thickness (d) of battery cell 1 in consideration of the above so that the upper surface of battery cell 1 can be reliably pressed. Pitch (t) of elastomer moldings 18 is made equal to a pitch of battery cells 1 constituting battery stack 10, and is preferably made equal to pitch (T) of battery cells 1 in battery stack 10 in a state where end plates 20 disposed on respective opposite end surfaces of battery stack 10 are joined by bind bars 15.

As illustrated in FIGS. 17 and 18, each elastomer molding 18 is provided with rubbery pressing part 18a protruding from a pressing surface covering the lower surface of pressing piece 15n toward the upper surface of battery cell 1. Rubbery pressing part 18a is in a columnar shape or a plate shape that locally presses the upper surface of battery cell 1. Rubbery pressing part 18a has a leading end that is in a planar shape in surface contact with the upper surface of battery cell 1, and presses the upper surface of battery cell 1 with a predetermined area. Elastomer molding 18 in the drawing is provided with rubbery pressing parts 18a different in protrusion height so that each battery cell 1 can be reliably disposed at a predetermined position. Elastomer molding 18 illustrated in FIG. 17 includes rubbery pressing parts 18a different in protrusion height that are disposed side by side in the longitudinal direction of the upper surface of battery cell 1, rubbery pressing parts 18a each having a high protrusion height that are disposed on the upper surface of battery cell 1 on respective opposite end sides.

Although not illustrated, the power supply device can include a bind bar provided with pressing pieces that independently press respective battery cells, and elastomer moldings disposed between respective pressing pieces and upper surfaces of the respective battery cells to independently press the respective battery cells. This power supply device has a feature in that the pressing piece and the elastomer molding are disposed facing each battery cell to enable each battery cell constituting the battery stack to be disposed at a predetermined position in the most ideal state.

The power supply device described above can be used as a power supply for a vehicle where electric power is supplied to a motor used for traveling an electric vehicle. As an electric vehicle on which the power supply device is mounted, an electric vehicle such as a hybrid automobile or a plug-in hybrid automobile that travels by both an engine and a motor, or an electric automobile that travels only by a motor can be used, and the power supply device is used as a power supply for these vehicles. To obtain electric power that drives a vehicle, a large-capacity, high-output power supply device may be assembled by connecting many power supply devices described above in series or in parallel, a required controlling circuit is added to such large-capacity, high-output power supply device, and such a power supply device may be mounted on a vehicle.

(Power Supply Device for Hybrid Automobile)

Figure 19:
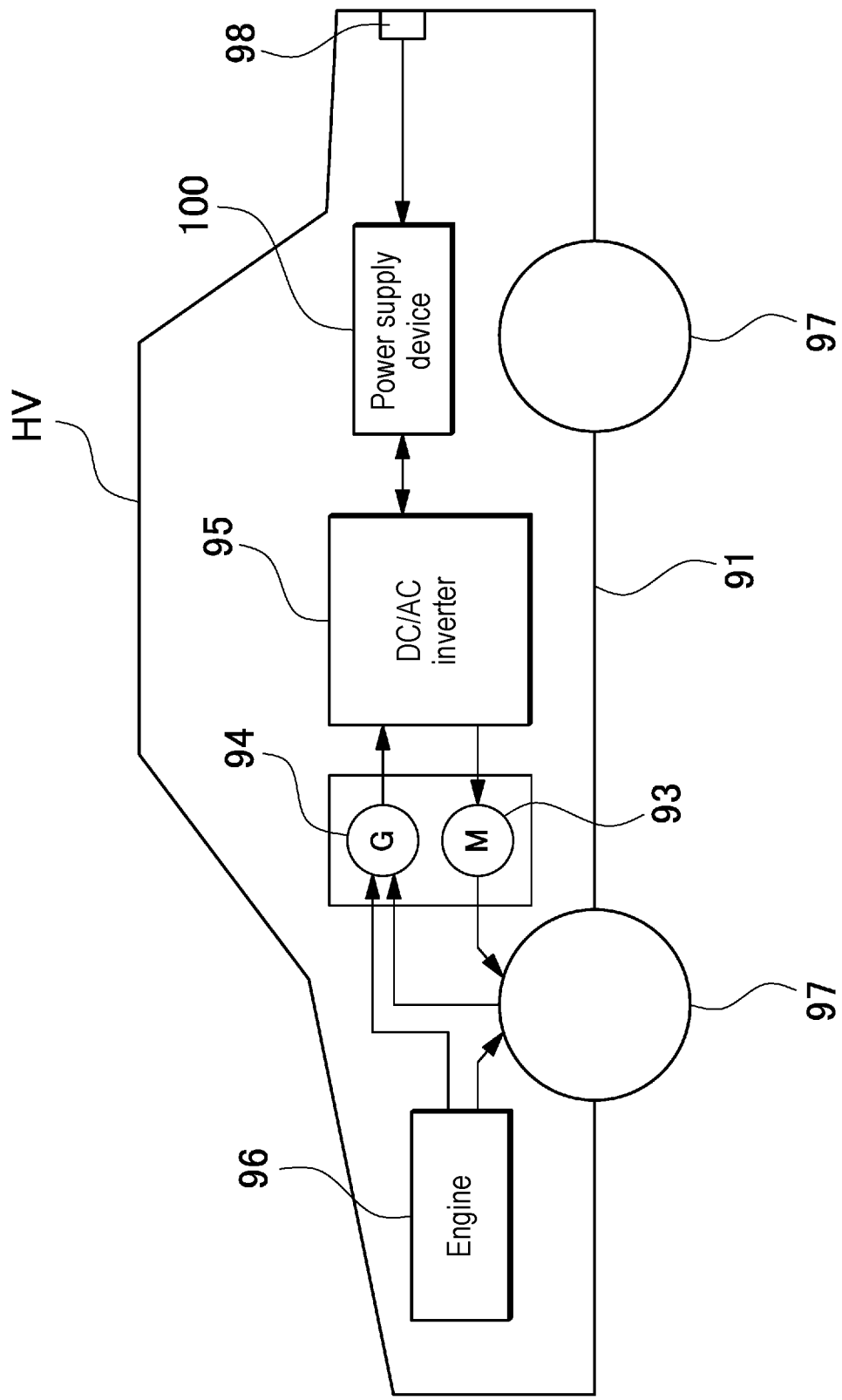
FIG. 19 is a block diagram illustrating an example of a power supply device mounted in a hybrid automobile that travels by an engine and a motor.

FIG. 19 illustrates an example in which a power supply device is mounted on a hybrid automobile that travels using both an engine and a motor. Vehicle HV illustrated in the drawing on which the power supply device is mounted includes: vehicle body 91; engine 96 and running motor 93 for travelling vehicle body 91; wheels 97 that are driven by engine 96 and running motor 93; power supply device 100 that supplies electric power to running motor 93; and power generator 94 that charges a battery of power supply device 100. Power supply device 100 is connected to running motor 93 and power generator 94 via DC/AC inverter 95. Vehicle HV travels using both running motor 93 and engine 96 while charging or discharging the battery of power supply device 100. Running motor 93 is driven in a region where an engine efficiency is low, e.g., during acceleration or low-speed traveling, and causes the vehicle to travel. Running motor 93 is driven by electric power supplied from power supply device 100. Power generator 94 is driven by engine 96 or driven by regenerative braking acquired when braking is applied to a vehicle, and charges the battery of power supply device 100. As illustrated in the drawing, vehicle HV may include charging plug 98 to charge power supply device 100. Connecting charging plug 98 to an external power source enables charging of power supply device 100.

(Power Supply Device for Electric Automobile)

Figure 20:
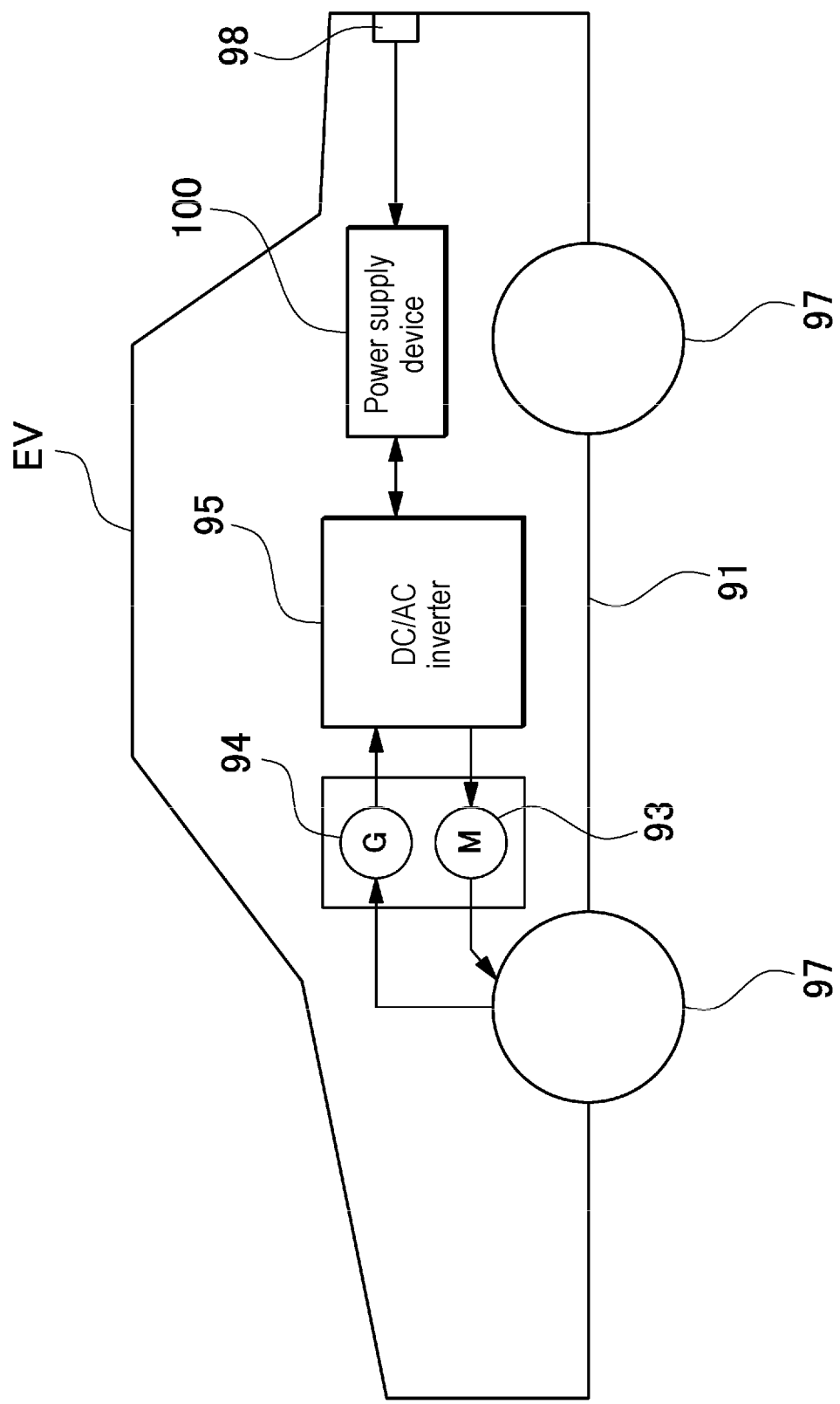
FIG. 20 is a block diagram illustrating an example of a power supply device mounted in an electric vehicle that travels only using a motor.

FIG. 20 illustrates an example in which a power supply device is mounted on an electric automobile that travels using only a motor. Vehicle EV illustrated in FIG. 20 on which the power supply device is mounted includes: vehicle body 91; running motor 93 for travelling vehicle body 91; wheels 97 driven by running motor 93 for vehicle traveling; power supply device 100 that supplies electric power to running motor 93; and power generator 94 that charges a battery of power supply device 100. Power supply device 100 is connected to running motor 93 and power generator 94 via DC/AC inverter 95. Running motor 93 is driven by electric power supplied from power supply device 100. Power generator 94 is driven by the energy at the time of applying regenerative braking to vehicle EV, and charges the battery of power supply device 100. Vehicle EV further includes charging plug 98, and power supply device 100 can be charged by connecting charging plug 98 to an external power source.

(Power Supply Device for Electrical Storage Device)

Figure 21:
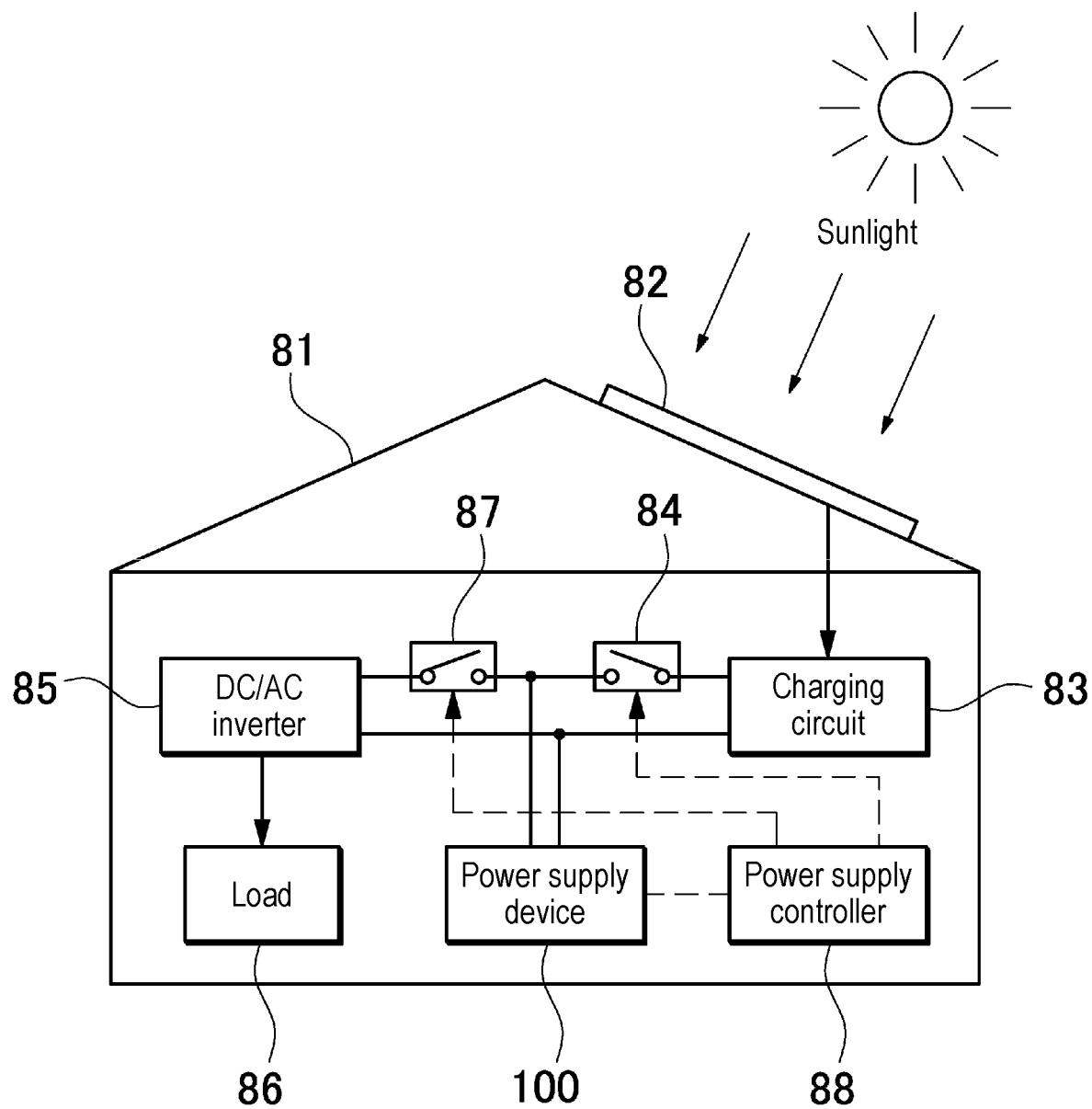
FIG. 21 is a block diagram illustrating an example of application to a power supply device for power storage.
Figure 22:
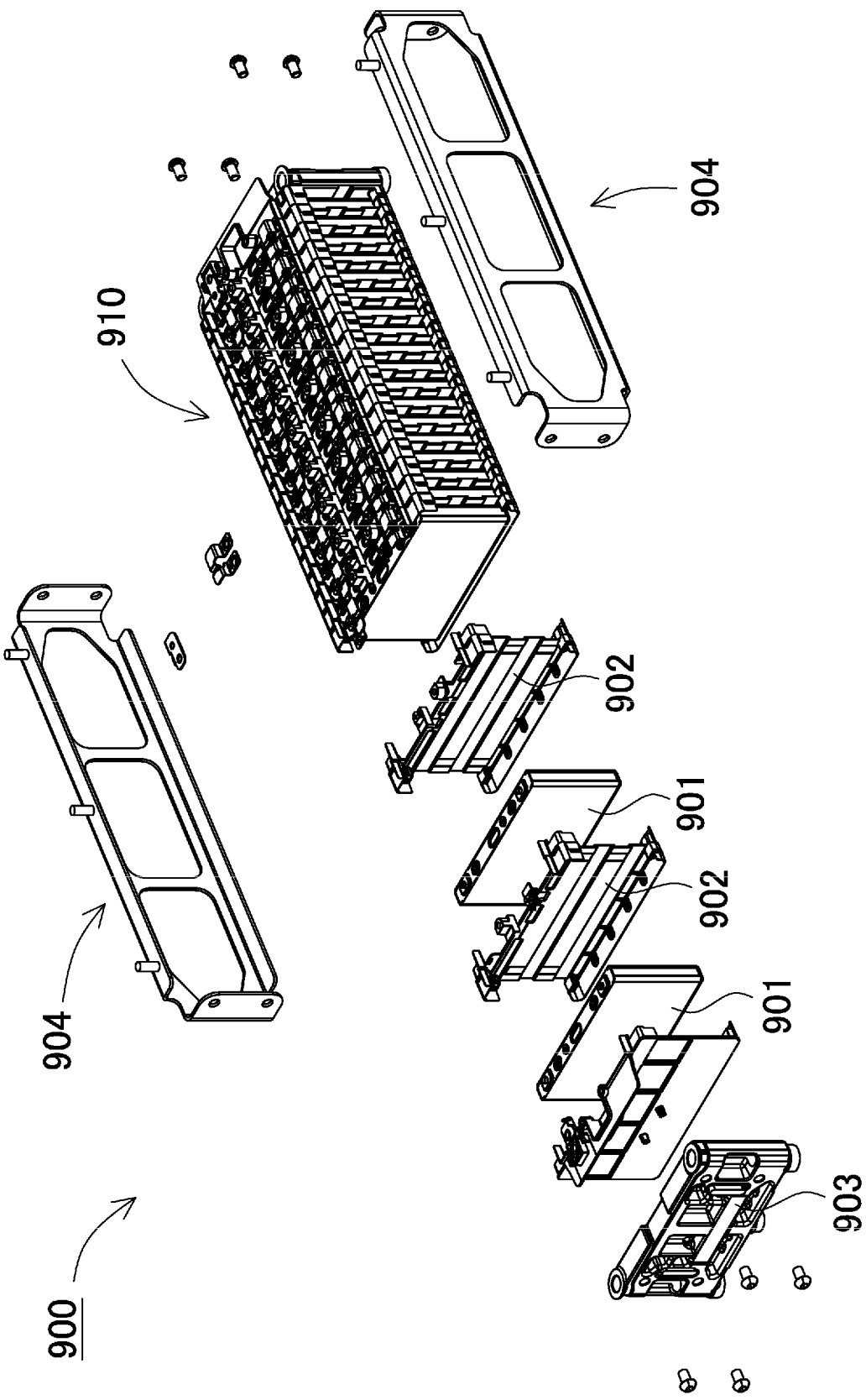
FIG. 22 is an exploded perspective view illustrating a conventional power supply device.

The application of the power supply device of the present invention is not limited to a power source for a motor that causes a vehicle to travel. The power supply device according to the exemplary embodiments can be used as a power source for an electrical storage device that performs power storage by charging a battery with electric power generated by photovoltaic power generation, wind power generation, or other methods. FIG. 21 illustrates an electrical storage device that performs power storage by charging the battery of power supply device 100 by solar battery 82.

The electrical storage device illustrated in FIG. 21 charges the battery of power supply device 100 with electric power generated by solar battery 82 disposed on a roof or a rooftop of building 81 such as a house and a factory. This electrical storage device charges the battery of power supply device 100 via charging circuit 83 with solar battery 82 serving as a charging power source, and then supplies electric power to load 86 via DC/AC inverter 85. Thus, this electrical storage device includes a charge mode and a discharge mode. In the electrical storage device illustrated in the drawing, DC/AC inverter 85 and charging circuit 83 are connected to power supply device 100 via discharging switch 87 and charging switch 84, respectively. Discharging switch 87 and charging switch 84 are turned on and off by power supply controller 88 of the electrical storage device. In the charge mode, power supply controller 88 turns on charging switch 84 and turns off discharging switch 87 to allow charging from charging circuit 83 to power supply device 100. When charging is completed and the battery is fully charged or when the battery is in a state where a capacity of a predetermined value or greater is charged, power supply controller 88 turns off charging switch 84 and turns on discharging switch 87 to switch the mode to the discharge mode and allow discharging from power supply device 100 to load 86. As necessary, power supply controller 88 can supply electric power to load 86 and charge power supply device 100 simultaneously by turning on charging switch 84 and turning on discharging switch 87.

Although not illustrated, the power supply device can also be used as a power source of an electrical storage device that performs power storage by charging a battery using midnight electric power at night. The power supply device charged with midnight electric power is charged with the midnight electric power, which is surplus electric power generated by a power station, and outputs the electric power during the daytime when an electric power load increases. Thus, peak electric power during the daytime can be limited to a small value. The power supply device can also be used as a power source charged with both output of a solar battery and the midnight electric power. This power supply device can efficiently perform power storage effectively using both electric power generated by the solar battery and the midnight electric power in consideration of weather and electric power consumption.

The electrical storage device described above can be suitably used for the following applications: a backup power supply device mountable in a rack of a computer server; a backup power supply device used for radio base stations of cellular phones; a power supply for power storage used at home or in a factory; an electrical storage device combined with a solar battery, such as a power supply for street lights; and a backup power supply for traffic lights or traffic displays for roads.

INDUSTRIAL APPLICABILITY

The power supply device according to the present invention, and an electric vehicle and an electrical storage device that use the power supply device, can be suitably used as a large current power supply used as a power supply for a motor for driving an electric vehicle such as a hybrid automobile, a fuel cell vehicle, an electric vehicle, or an electric motorcycle. Examples of the power supply device include a power supply device for a plug-in hybrid electric automobile and a hybrid electric automobile capable of switching a traveling mode between an EV traveling mode and an HEV traveling mode, and a power supply device for an electric automobile. The power supply device can be appropriately used for the following applications: a backup power supply device mountable in a rack of a computer sever; a backup power supply device used for radio base stations of cellular phones; a power source for storage used at home or in a factory; an electrical storage device combined with a solar battery, such as a power source for street lights; and a backup power source for traffic lights.

REFERENCE MARKS IN THE DRAWINGS

100, 200, 300: power supply device
1: battery cell
1X: terminal surface
1a: outer covering can
1b: sealing plate
2: electrode terminal
10: battery stack
15: bind bar
15a: intermediate part
15b: locking block
15c: joint
15ac: joint main surface-side through-hole
15bc: joint-side through-hole
15f: bolt
15i: corrugated piece
15j: corrugated part
15k: flat piece
15l: pressing piece
15m: intermediate part
15n: pressing piece
16: insulating spacer
17: end face spacer
18: elastomer molding
18a: rubbery pressing part
19: coupling part
20: end plate
20b: step
20c: end plate screw hole
30: insulating sheet
31: flat plate
32: pressing piece support
33: pressing piece covering part
40: elastomer unit
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
900: power supply device
901: battery cell
902: spacer
903: end plate
904: bind bar
910: battery stack
HV, EV: vehicle

The invention claimed is:

1. A power supply device comprising:
a plurality of battery cells each including an outer covering can in a prismatic shape and including a constant cell thickness, the plurality of battery cells being configured to be charged;
a pair of end plates for covering both side end surfaces of a battery stack in which the plurality of battery cells are stacked; and
bind bars that are disposed on opposite side surfaces of the battery stack and coupled to the pair of the end plates, wherein
the bind bars each include
a pressing piece for pressing an upper surface of each of adjacent battery cells adjacent to each other among the plurality of battery cells, and
an elastomer molding disposed between the pressing piece and the upper surface of the each of the adjacent battery cells, and
the pressing piece elastically presses the upper surface of the each of the adjacent battery cells with the elastomer molding,
the power supply device further comprising:
a plurality of the elastomer moldings each being the elastomer molding,
wherein the plurality of the elastomer moldings are spaced apart from each other in a stacking direction in which the plurality of battery cells are stacked,
wherein the elastomer molding includes a rubbery pressing part in a columnar shape or in a plate shape protruding toward the upper surface of the each of the adjacent battery cells, and
wherein a plurality of rubbery pressing parts being the rubbery pressing part, the elastomer molding includes the plurality of rubbery pressing parts different in protrusion height.

2. The power supply device according to claim 1, wherein the plurality of the elastomer moldings independently press the each of the adjacent battery cells.

3. The power supply device according to claim 1, wherein each of the bind bars includes a plurality of the pressing pieces each being the pressing piece independently pressing the each of the adjacent battery cells.

4. The power supply device according to claim 3, further comprising an insulating sheet disposed between each of the bind bars and the battery stack, wherein the insulating sheet is disposed between the plurality of the pressing pieces and the plurality of the elastomer moldings.

5. The power supply device according to claim 3, wherein the each of the bind bars is a metal sheet, and
the metal sheet is bent providing the plurality of the pressing pieces integrally with the each of the bind bars.

6. The power supply device according to claim 1, wherein the plurality of the rubbery pressing parts are disposed apart from each other in a longitudinal direction of the upper surface of the each of the adjacent battery cells.

7. The power supply device according to claim 1, wherein at least one of the plurality of the rubbery pressing parts includes a length at which the at least one rubbery pressing part buckles in a pressed state on the upper surface of the each of the adjacent battery cells.

8. The power supply device according to claim 1, wherein the elastomer molding includes an elastomer or rubber.

9. An electric vehicle including the power supply device according to claim 1, the electric vehicle comprising:
the power supply device;
a motor for running that receives electric power from the power supply device;
a vehicle body that is equipped with the power supply device and the motor; and
a wheel that is driven by the motor to let the vehicle body travel.

10. An electrical storage device including the power supply device according to claim 1, the electrical storage device comprising:
the power supply device; and
a power supply controller configured to control charging and discharging of the power supply device, the power supply controller enabling charging of the plurality of battery cells with electric power supplied from an outside and causing the plurality of battery cells to charge.

11. A power supply device comprising:
a plurality of battery cells each including an outer covering can in a prismatic shape and including a constant cell thickness, the plurality of battery cells being configured to be charged;
a pair of end plates for covering both side end surfaces of a battery stack in which the plurality of battery cells are stacked; and
bind bars that are disposed on opposite side surfaces of the battery stack and coupled to the pair of the end plates, wherein
the bind bars each include
a pressing piece for pressing an upper surface of each of adjacent battery cells adjacent to each other among the plurality of battery cells, and
an elastomer molding disposed between the pressing piece and the upper surface of the each of the adjacent battery cells, and
the pressing piece elastically presses the upper surface of the each of the adjacent battery cells with the elastomer molding,
wherein the elastomer molding includes a rubbery pressing part in a columnar shape or in a plate shape protruding toward the upper surface of the each of the adjacent battery cells, and
wherein a plurality of rubbery pressing parts being the rubbery pressing part, the elastomer molding includes the plurality of rubbery pressing parts different in protrusion height.

12. The power supply device according to claim 11, wherein the plurality of the rubbery pressing parts are disposed apart from each other in a longitudinal direction of the upper surface of the each of the adjacent battery cells.

13. The power supply device according to claim 11, wherein at least one of the plurality of the rubbery pressing parts includes a length at which the at least one rubbery pressing part buckles in a pressed state on the upper surface of the each of the adjacent battery cells.

* * * * *